United States Patent
Choi et al.

(10) Patent No.: US 11,570,694 B2
(45) Date of Patent: Jan. 31, 2023

(54) ACCESS CONTROL FOR WIRELESS CELLULAR COMMUNICATION SYSTEMS

(71) Applicant: Apple Inc., Cupertino, CA (US)

(72) Inventors: Hyung-Nam Choi, Hamburg (DE);
Marta Martinez Tarradell, Hillsboro, OR (US); Sudeep Palat, Gloucestershire (GB); Robert Zaus, Munich (DE); Youn Hyoung Heo, Seoul (KR); Richard Burbidge, Oxfordshire (GB)

(73) Assignee: Apple Inc., Cupertino, CA (US)

( * ) Notice: Subject to any disclaimer, the term of this patent is extended or adjusted under 35 U.S.C. 154(b) by 645 days.

(21) Appl. No.: 16/475,670

(22) PCT Filed: Dec. 29, 2017

(86) PCT No.: PCT/US2017/069108
§ 371 (c)(1),
(2) Date: Jul. 2, 2019

(87) PCT Pub. No.: WO2018/128947
PCT Pub. Date: Jul. 12, 2018

(65) Prior Publication Data
US 2019/0349843 A1    Nov. 14, 2019

Related U.S. Application Data

(60) Provisional application No. 62/443,342, filed on Jan. 6, 2017.

(51) Int. Cl.
*H04W 48/12* (2009.01)
*H04W 48/02* (2009.01)
*H04W 84/04* (2009.01)

(52) U.S. Cl.
CPC .......... *H04W 48/12* (2013.01); *H04W 48/02* (2013.01); *H04W 84/042* (2013.01)

(58) Field of Classification Search
CPC ..... H04W 48/12; H04W 48/02; H04W 48/08; H04W 48/14; H04W 84/042;
(Continued)

(56) References Cited

U.S. PATENT DOCUMENTS

2013/0188601 A1 * 7/2013 Sun ..................... H04L 45/3065
                                                                  370/331
2016/0278096 A1 * 9/2016 Watfa ................ H04W 72/0486
2016/0302151 A1 * 10/2016 Jung ..................... H04W 76/18

FOREIGN PATENT DOCUMENTS

EP        2061192          5/2009
EP        2061192 A1 *     5/2009   ............ H04W 72/02
(Continued)

OTHER PUBLICATIONS

EP-2061192-A1 (Research In Motion Limited) (Year: 2009).*
(Continued)

*Primary Examiner* — Christopher M Crutchfield
*Assistant Examiner* — Jean F Voltaire
(74) *Attorney, Agent, or Firm* — Sterne, Kessler, Goldstein & Fox P.L.L.C.

(57) ABSTRACT

Described is an apparatus of a User Equipment (UE). The apparatus may comprise a first circuitry, a second circuitry, and a third circuitry. The first circuitry may be operable to determine that the UE is in an Inactive Radio Resource Control (RRC) state. The second circuitry may be operable to process a first transmission received by the UE while the UE is in the Inactive RRC state, the first transmission carrying a set of one or more Access Control (AC) parameters. The third circuitry may be operable to regulate the sending of a second transmission, in accordance with the set of one or more AC parameters, while the UE is in the Inactive RRC state.

24 Claims, 15 Drawing Sheets

(58) Field of Classification Search
CPC ... H04W 88/02; Y02D 70/00; Y02D 70/1242; Y02D 70/1262; Y02D 70/1264; Y02D 70/142; Y02D 70/144; Y02D 70/166; Y02D 70/21; Y02D 70/24
USPC .......................................................... 370/328
See application file for complete search history.

(56) References Cited

FOREIGN PATENT DOCUMENTS

| WO | 2018143631 | 8/2018 |
|---|---|---|
| WO | 2018144281 | 8/2018 |

OTHER PUBLICATIONS

International Search Report and Written Opinion for PCT Application No. PCT/US17/69108, dated Jan. 21, 2019.
OPPO,"Discussion on NR System Information Design", 3GPP Draft; R2-166191; vol. RAN WG2, Kaohsiung, Oct. 9, 2016.
International Preliminary Report on Patentability for PCT Application No. PCT/US17/69108, dated Jul. 18, 2019 17 pgs.
Ericsson, "Access control for NR", 3GPP TSG-RAN WG2 #96; R2-168485; Reno, Nevada, USA, Nov. 14-18, 2016.
Huawei, et al., "Access control in NR", 3GPP TSG-RAN WG2 Meeting #96; R2-168256; Reno, Nevada, USA, Nov. 14-18, 2016.
LG Electronics, "Access Control for New RAT", 3GPP TSG-RAN WG2 #96; R2-168418; Reno, Nevada, USA, Nov. 14-18, 2016.
Mediatek, Inc., "Simplified Access Control", 3GPP TSG-RAN2 #96 Meeting; R2-168813; Reno, Nevada, USA; Nov. 14-18, 2016.
NTT Docomo, "Revision of SI: Study on New Radio Access Technology", 3GPP TSG RAN Meeting #74; RP-162469; Vienna, Austria, Dec. 5-8, 2016.
NTT Docomo, "TR 38.804 v0.4.0 on Study on New Radio Access Technology; Radio Interface Protocol Aspects", 3GPP TSG-RAN WG2 #96; R2-169068; Reno, Nevada, USA, Nov. 14-18, 2016.
Samsung, "Way forward for NR barring", 3GPP TSG-RAN WG2 Meeting #96; R2-167903; Reno, Nevada, USA, Nov. 14-18, 2016.
ZTE, "Consideration on the access control in NR", 3GPP TSG-RAN WG2 Meeting #96; R2-167846; Reno, Nevada, USA, Nov. 14-18, 2016.

* cited by examiner data flow aggregation across
LTE eNB and NR gNB via EPC

*hierarchical AC parameter signaling structure*

```
510 ⤳   AC-Parameters ::=           CHOICE {
             ac-BarringCommonPLMN        AC-BarringPerSlice-List,
             ac-BarringPerPLMN-List      AC-BarringPerPLMN-List
         }

AC-BarringPerPLMN-List ::= SEQUENCE (SIZE (1.. maxPLMN-r15)) OF AC-BarringPerPLMN 520 ⤳   AC-BarringPerPLMN ::=      SEQUENCE {
             plmn-IdentityIndex         INTEGER (1..maxPLMN),
             ac-BarringPerSlice-List    AC-BarringPerSlice-List
         }

AC-BarringPerSlice-List ::= SEQUENCE (SIZE (1.. maxSlice)) OF AC-BarringPerSlice 530 ⤳   AC-BarringPerSlice ::=     SEQUENCE {
             slice-IdentityIndex        INTEGER (1..maxSlice),
             ac-BarringForMO-Signalling ac-BarringConfig           OPTIONAL,   -- Need OP
             ac-BarringForMO-Data       ac-BarringConfig           OPTIONAL,   -- Need OP
         }

540 ⤳   AC-BarringConfig ::=       SEQUENCE {
             ac-BarringType             SEQUENCE {
                 deviceType                 AC-BarringInfoForDeviceList  OPTIONAL,  -- Need OP
                 serviceType                AC-BarringInfoForServiceList OPTIONAL,  -- Need OP
             }
         }
         ...
```

*hierarchical AC parameter signaling structure (cont'd)*

...

```
AC-BarringInfoForDeviceList ::= SEQUENCE (SIZE (1..maxAC)) OF AC-BarringInfoForDevice AC-BarringInfoForDevice ::= SEQUENCE {
    ac-IdentityIndex         INTEGER (1..maxAC),
    ac-Barring               CHOICE {
        ac-BarringFlag       ENUMERATED {barred, notBarred},
        ac-BarringTimeFactor SEQUENCE {
            ac-BarringFactor ENUMERATED {
                p00, p05, p10, p15, p20, p25, p30, p40,
                p50, p60, p70, p75, p80, p85, p90, p95},
            ac-BarringTime   ENUMERATED {s4, s8, s16, s32, s64, s128, s256, s512}
        }
    }
}
```
← 551

```
AC-BarringInfoForServiceList ::= SEQUENCE (SIZE (1..maxService)) OF AC-BarringInfoForService AC-BarringInfoForService ::= SEQUENCE {
    service-IdentityIndex    INTEGER (1..maxService),
    ac-Barring               CHOICE {
        ac-BarringFlag       ENUMERATED {barred, notBarred},
        ac-BarringTimeFactor SEQUENCE {
            ac-BarringFactor ENUMERATED {
                p00, p05, p10, p15, p20, p25, p30, p40,
                p50, p60, p70, p75, p80, p85, p90, p95},
            ac-BarringTime   ENUMERATED {s4, s8, s16, s32, s64, s128, s256, s512}
        }
    }
}
```
← 552

ACCESS CONTROL FOR WIRELESS CELLULAR COMMUNICATION SYSTEMS

CLAIM OF PRIORITY

This Application is a National Stage Entry of, and claims priority to, PCT Application No. PCT/US17/69108, filed on Dec. 29, 2017 and titled "ACCESS CONTROL FOR WIRELESS CELLULAR COMMUNICATION SYSTEMS", which claims priority under 35 U.S.C. § 119(e) to U.S. Provisional Patent Application Ser. No. 62/443,342 filed Jan. 6, 2017, both of which are herein incorporated by reference in their entireties.

BACKGROUND

A variety of wireless cellular communication systems have been implemented, including a 3rd Generation Partnership Project (3GPP) Universal Mobile Telecommunications System, a 3GPP Long-Term Evolution (LTE) system, and a 3GPP LTE-Advanced (LTE-A) system. Next-generation wireless cellular communication systems based upon LTE and LTE-A systems are being developed, such as a fifth generation (5G) wireless system/5G mobile networks system, and a 5G New Radio (NR) system. Next-generation wireless cellular communication systems may provide support for enhanced Mobile Broadband (eMBB) capable devices, massive Machine-Type Communication (mMTC) capable devices, and Ultra-Reliable and Low Latency Communications (URLLC) capable devices.

BRIEF DESCRIPTION OF THE DRAWINGS

The embodiments of the disclosure will be understood more fully from the detailed description given below and from the accompanying drawings of various embodiments of the disclosure. However, while the drawings are to aid in explanation and understanding, they are only an aid, and should not be taken to limit the disclosure to the specific embodiments depicted therein.

FIGS. 5A-5B illustrate a hierarchical Access Control (AC) parameter signaling structure, in accordance with some embodiments of the disclosure.

DETAILED DESCRIPTION

Various wireless cellular communication systems have been implemented or are being proposed, including a 3rd Generation Partnership Project (3GPP) Universal Mobile Telecommunications System (UMTS), a 3GPP Long-Term Evolution (LTE) system, a 3GPP LTE-Advanced system, and a 5th Generation (5G) wireless system/5G mobile networks system/5G New Radio (NR) system.

Next-generation access technologies may be targeted to satisfy increasing needs of placed on mobile communications due to the growth of data traffic, the increase of connected devices, and the continuous emergence of new services. NR access technologies may meet a broad range of new use cases (which may also be termed services, or "verticals"), including enhanced mobile broadband (eMBB), massive Machine-Type Communication (mMTC), and Ultra-Reliable and Low Latency Communications (URLLC).

Access Control (AC) may be a significant functionality for NR access technologies. In general, an objective of NR AC in the Radio Resource Control (RRC) IDLE state may be to control access attempts by User Equipments (UEs) for RRC connection establishments (e.g., for data and signaling). AC may depend upon Radio Access Network (RAN) overload or Core Network (CN) overload.

In some embodiments, AC may restrict or prevent overload of a Random Access Channel (RACH) in a cell during congestion situations (e.g., a disaster or a sudden surge of Machine-Type Communication (MTC) traffic). For some embodiments, AC may prevent overload in a network node (e.g., a RAN or a CN) due to temporary limitations on capacity (e.g., with regards to buffer capacity or system bandwidth), such as may be due to temporary surges of User-Plane (UP) traffic in stadiums, concerts, and so on. In some embodiments, AC may prioritize certain services (e.g., emergency calls, voice calls) over other services during congestion situations. For some embodiments, during congestion situations, AC may prioritize certain types of UEs (e.g., high-priority UEs of AC 11 through 15) over other types of UEs (e.g. normal UEs of AC 0 through 9).

Moreover, in NR, AC may also be suitable for UEs with RRC connections already established, as well as for UEs with RRC connections that are non-active (which may also referred to as INACTIVE, or suspended). Therefore, AC improvements such as those disclosed herein may be applicable for UEs in any NR RRC or RAN state (e.g., including CONNECTED, IDLE, and INACTIVE), or may be applicable to merely some of the NR RRC or RAN states (e.g., merely IDLE). Alternatively, parts of the AC mechanisms and methods disclosed herein may be applicable differently to different NR RRC or RAN states, or may have different behavior for different NR RRC or RAN states.

Figure 1:
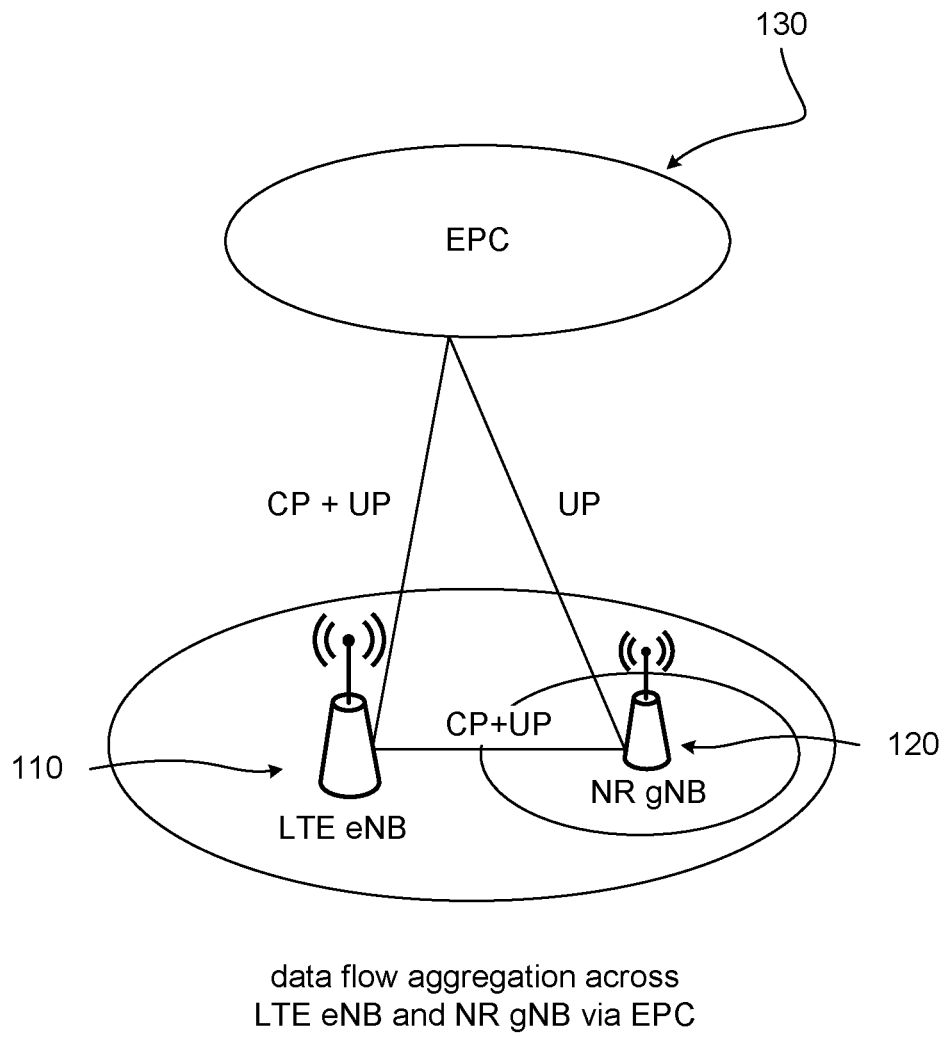
FIG. 1 illustrates a non-standalone New Radio (NR) scenario, in accordance with some embodiments of the disclosure.

In various embodiments, NR systems may be deployed in non-standalone scenarios and in standalone scenarios. FIG. 1 illustrates a non-standalone NR scenario, in accordance with some embodiments of the disclosure. A non-standalone NR scenario 100 may comprise an LTE Evolved Node-B (eNB) 110, an NR gNB 120, and an Evolved Packet Core (EPC) 130. The term "gNB" may refer to a 5G-capable or NR-capable eNB. LTE eNB 110 may act as a master node, and data transport may be performed through LTE eNB 110, or through NR gNB 120, or through both, via EPC.

For scenario 100, there may exist one Control Plane (CP) connection between a CN and a RAN. UP data may be routed to a RAN directly through a CN on a bearer basis (e.g., along a connection between NR gNB 120 and EPC 130 labeled "UP"). Alternatively, UP data flow in the same bearer may be split at a RAN (e.g., along a connection between LTE eNB 110 and NR gNB 120 labeled "CP+UP").

In some embodiments, an evolved LTE (eLTE) eNB may act as a master node, and may be connected to a Next-Generation CN. Data transport may be performed through the eLTE eNB and/or an NR gNB via a Next-Generation CN. An eLTE eNB may accordingly support connectivity to an EPC and a Next-Generation CN.

Figure 2:
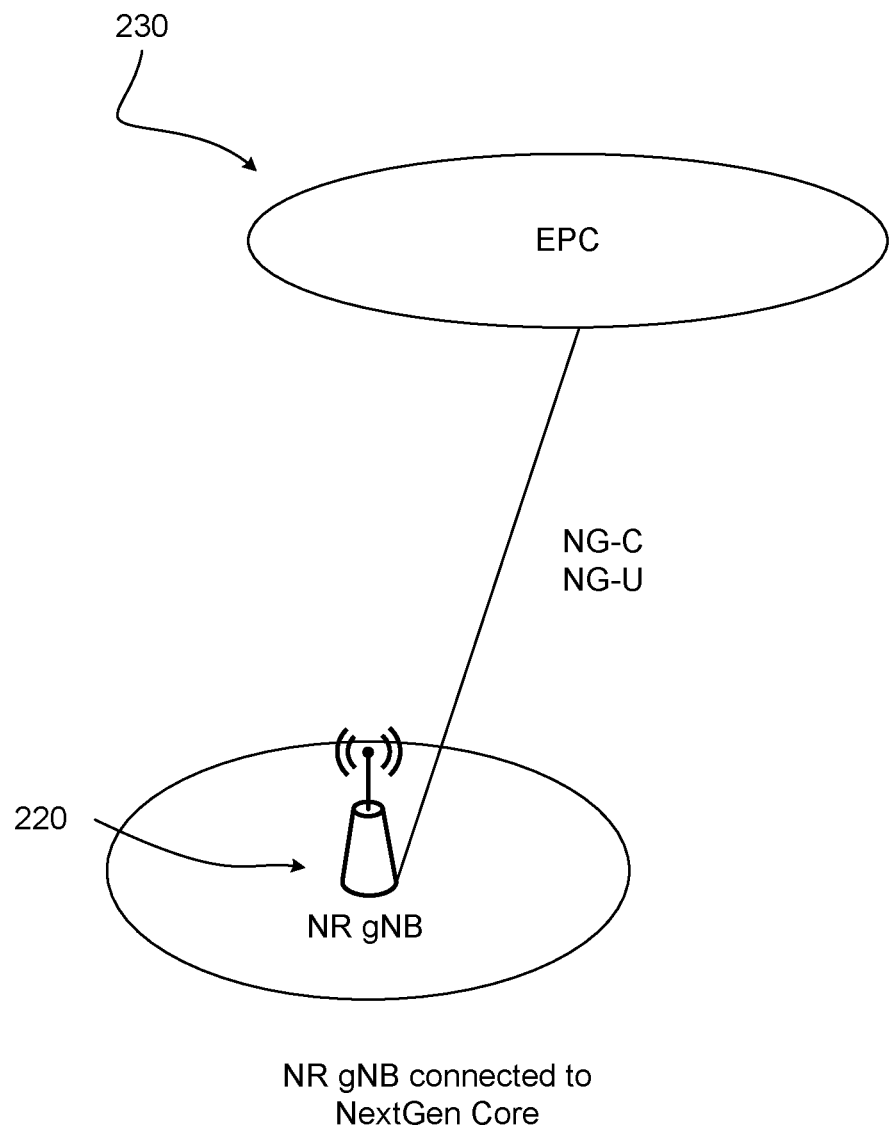
FIG. 2 illustrates a standalone NR scenario, in accordance with some embodiments of the disclosure.

FIG. 2 illustrates a standalone NR scenario, in accordance with some embodiments of the disclosure. A standalone NR scenario 200 may comprise an NR gNB 220 and an EPC 230. NR gNB 220 may act as a master node, and may be connected to a Next-Generation CN via a Next Generation Control plane (NG-C) interface and a Next Generation User plane (NG-U) interface (e.g., along a connection between NR gNB 220 and EPC 230 labeled "NG-C/NG-U").

Figure 3:
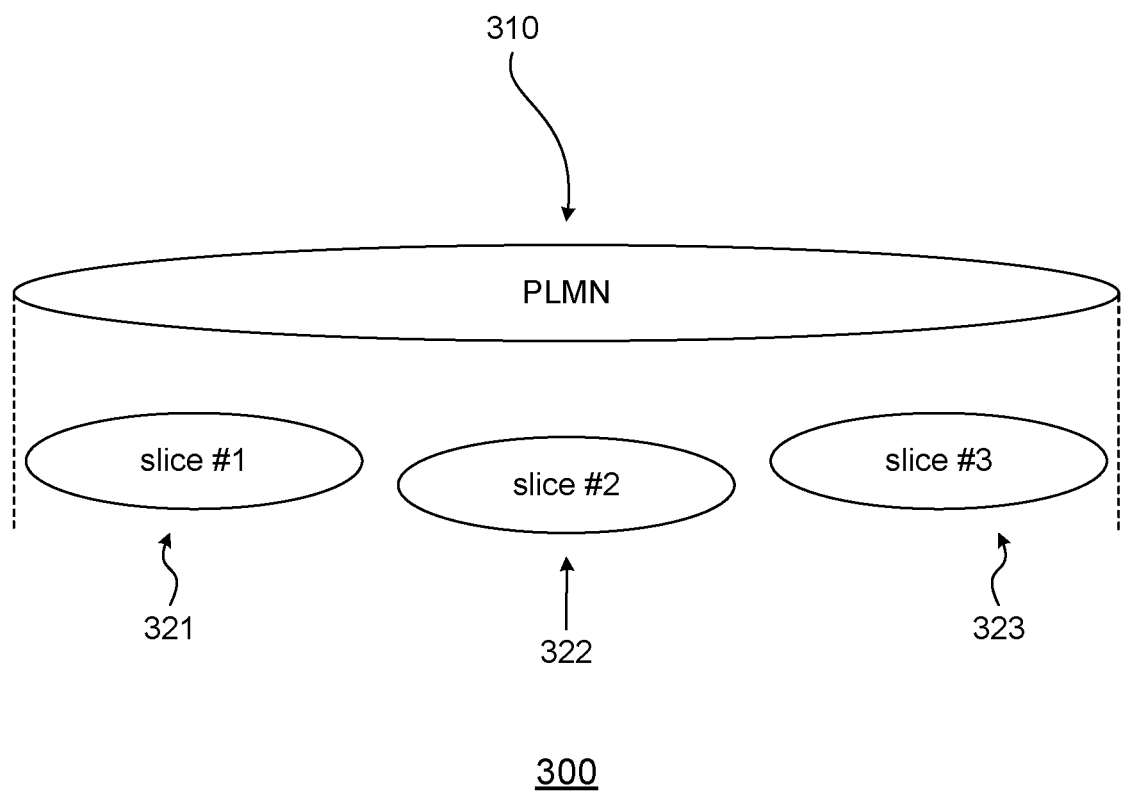
FIG. 3 illustrates a scenario of network slicing, in accordance with some embodiments of the disclosure.

Various embodiments disclosed herein may also incorporate network-slicing-specific AC. FIG. 3 illustrates a scenario of network slicing, in accordance with some embodiments of the disclosure. A scenario 300 may comprise a Public Land Mobile Network (PLMN) 310, a first network slice 321, a second network slice 322, and a third network slice 323, which may support respectively corresponding sets of services.

Network slicing may enable an operator to create networks customized to provide optimized solutions for different market scenarios with potentially diverging characteristics, such as with respect to functionality, performance, and isolation (e.g., different use cases). Network slicing may be done with or without slicing the radio (e.g., a RAN). In cases of network slicing, congestion may happen differently in each of the slices, and accordingly it may be desirable to apply slice-specific AC (e.g., per cell).

Furthermore, in various embodiments, slice-specific AC mechanisms and methods disclosed herein may have various aspects. One aspect may be partitioning of RAN resources into service-provider-controlled slices. Another aspect may pertain to hard partitioning of the slices or soft partitioning of the slices (e.g., either fixed partitioning or flexible/dynamic partitioning). Another aspect may relate to PLMNs comprising various numbers of slices (e.g., one or more slices). Another aspect may relate to slices comprising one or more cells which may belong to different slices. Another aspect may relate to support for mapping of a number N of services (or verticals) onto a slice. Another aspect may relate to support for mapping of a number L of slices onto a vertical.

Figure 4:
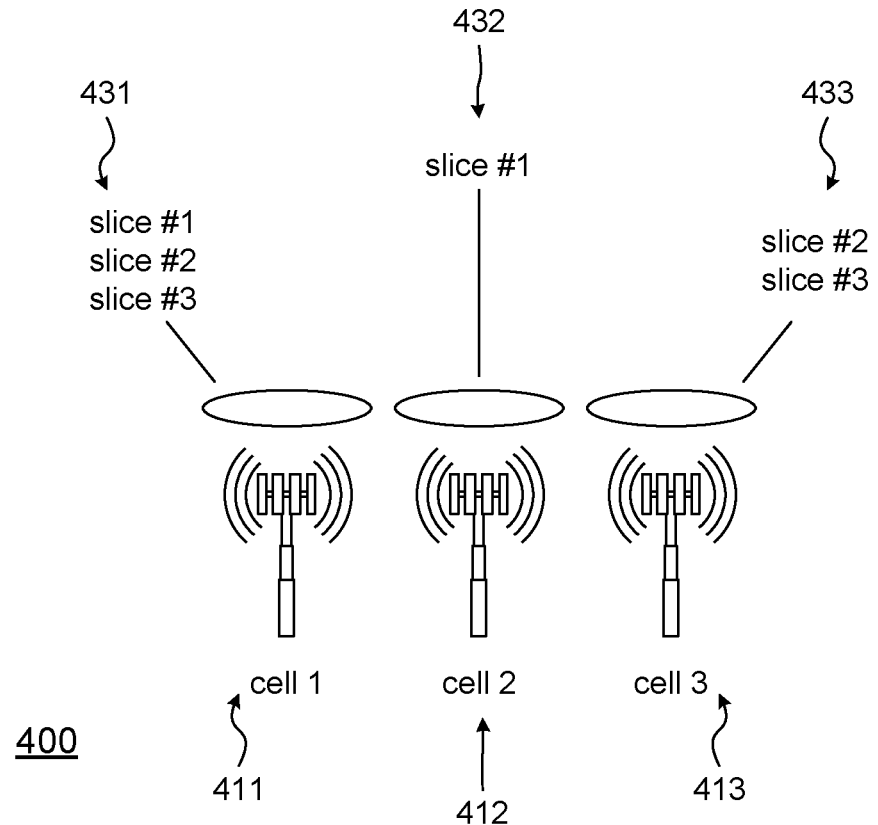
FIG. 4 illustrates a scenario of network slicing on a radio level, in accordance with some embodiments of the disclosure.

FIG. 4 illustrates a scenario of network slicing on a radio level, in accordance with some embodiments of the disclosure. A scenario 400 may comprise a first cell 411, a second cell 412, and a third cell 413, which may support, respectively, a first set of slices 431, a second set of slices 432, and a third set of slices 433. In turn, each of first set of slices 431, second set of slices 432, and third set of slices 433 may comprise a variety of slices, which may in turn provide one or more services (or verticals), such as eMBB services, mMTC services, and URLLC services.

For example, a network slice #1 (which may be supported by first cell 411 and second cell 412) may provide services types 1 through N, which may be eMBB services, mMTC services, and URLLC services. A network slice #2 (which may be supported by first cell 411 and third cell 413) may provide service types 1 through 3, which may be eMBB services and mMTC services. A network slice #3 (which may be supported by first cell 411 and third cell 413) may provide service types 1, 2, and N, which may be eMBB services and URLLC services.

Various embodiments may support RAN sharing by different PLMNs. For example, some embodiments may support RAN sharing by up to six or more PLMNs. In various embodiments, AC parameters may be configured commonly, or may be configured separately for PLMNs sharing the same RAN.

Various embodiments may support control of access attempts for certain types of UEs based on AC in some or all NR RRC states. Various embodiments may also support control of access attempts for Mobile Originated (MO) calls (e.g., data, or signaling, or both) in some or all NR RRC states. Various embodiments may support control of access attempts for different types or categories of services or applications, in some NR RRC states (up to and including all NR RRC states).

Various embodiments may also support efficient transmission of AC parameters in different NR RRC states (e.g., per system information).

Various embodiments may promote efficient support of NR use cases (or verticals). Some embodiments may support eMBB use cases, in which a target may be to achieve a peak data rate of up to 20 gigabits per second (Gbps) in Downlink (DL) and 10 Gbps in Uplink (UL). For eMBB use cases, AC mechanisms in IDLE and CONNECTED states may be disposed to addressing normal UEs and high-priority UEs.

Some embodiments may support mMTC use cases. For mMTC use cases, AC mechanisms may be disposed to coping with possible surges of MTC traffic of low-priority and delay-tolerant MTC UEs in IDLE state.

Some embodiments may support URLLC uses cases, in which a target may be to achieve a high-reliable user plane latency of up to 0.5 milliseconds (ms) in UL, in DL, or in both. For URLLC use cases, AC mechanisms may be disposed to address UEs merely in CONNECTED state. Examples of services requiring URLLC may include V2X services and high-priority MTC services.

The verticals may result in Data Radio Bearer (DRB) configurations having different Quality-of-Service (QoS). As a consequence, NR AC may be disposed to being applicable for all verticals, and may be disposed to allowing different handling of QoS.

In addition, some AC behaviors or configurations disclosed herein might be defined or set differently for each of the verticals. For example, AC behaviors or configurations may be different depending on a frequency for a UE to acquire AC under the different use cases or verticals, or depending on a mechanism for the UE to be notified when AC parameters are changed for each use case or vertical.

Although various AC mechanisms and methods disclosed herein may be suitable for NR application, they may also be suitable for various other evolutions of current technologies, such as for LTE.

In the following description, numerous details are discussed to provide a more thorough explanation of embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, mechanical, or magnetic connection between the things that are connected, without any intermediary devices. The term "coupled" means either a direct electrical, mechanical, or magnetic connection between the things that are connected or an indirect connection through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The terms "substantially," "close," "approximately," "near," and "about" generally refer to being within +/−10% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking, or in any other manner.

It is to be understood that the terms so used are interchangeable under appropriate circumstances such that the embodiments of the invention described herein are, for example, capable of operation in other orientations than those illustrated or otherwise described herein.

The terms "left," "right," "front," "back," "top," "bottom," "over," "under," and the like in the description and in the claims, if any, are used for descriptive purposes and not necessarily for describing permanent relative positions.

For purposes of the embodiments, the transistors in various circuits, modules, and logic blocks are Tunneling FETs (TFETs). Some transistors of various embodiments may comprise metal oxide semiconductor (MOS) transistors, which include drain, source, gate, and bulk terminals. The transistors may also include Tri-Gate and FinFET transistors, Gate All Around Cylindrical Transistors, Square Wire, or Rectangular Ribbon Transistors or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors-BJT PNP/NPN, BiCMOS, CMOS, etc., may be used for some transistors without departing from the scope of the disclosure.

For the purposes of the present disclosure, the phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

In addition, for purposes of the present disclosure, the term "eNB" may refer to a legacy LTE capable Evolved Node-B (eNB), a next-generation or 5G capable eNB, a centimeter-wave (cmWave) capable eNB or a cmWave small cell, a millimeter-wave (mmWave) capable eNB or an mmWave small cell, an Access Point (AP), and/or another base station for a wireless communication system. For purposes of the present disclosure, the term "UE" may refer to a legacy LTE capable User Equipment (UE), an mmWave capable UE, a cmWave capable UE, a Station (STA), and/or another mobile equipment for a wireless communication system. The term "UE" may also refer to a next-generation or 5G capable UE.

Various embodiments of eNBs and/or UEs discussed below may process one or more transmissions of various types. Some processing of a transmission may comprise demodulating, decoding, detecting, parsing, and/or otherwise handling a transmission that has been received. In some embodiments, an eNB or UE processing a transmission may determine or recognize the transmission's type and/or a condition associated with the transmission. For some embodiments, an eNB or UE processing a transmission may act in accordance with the transmission's type, and/or may act conditionally based upon the transmission's type. An eNB or UE processing a transmission may also recognize one or more values or fields of data carried by the transmission. Processing a transmission may comprise moving the transmission through one or more layers of a protocol stack (which may be implemented in, e.g., hardware and/or software-configured elements), such as by moving a transmission that has been received by an eNB or a UE through one or more layers of a protocol stack.

Various embodiments of eNBs and/or UEs discussed below may also generate one or more transmissions of various types. Some generating of a transmission may comprise modulating, encoding, formatting, assembling, and/or otherwise handling a transmission that is to be transmitted. In some embodiments, an eNB or UE generating a transmission may establish the transmission's type and/or a condition associated with the transmission. For some embodiments, an eNB or UE generating a transmission may act in accordance with the transmission's type, and/or may act conditionally based upon the transmission's type. An eNB or UE generating a transmission may also determine one or more values or fields of data carried by the transmission. Generating a transmission may comprise moving the transmission through one or more layers of a protocol stack (which may be implemented in, e.g., hardware and/or software-configured elements), such as by moving a transmission to be sent by an eNB or a UE through one or more layers of a protocol stack.

In various embodiments, resources may span various Resource Blocks (RBs), Physical Resource Blocks (PRBs), and/or time periods (e.g., frames, subframes, and/or slots) of a wireless communication system. In some contexts, allocated resources (e.g., channels, Orthogonal Frequency-Division Multiplexing (OFDM) symbols, subcarrier frequencies, resource elements (REs), and/or portions thereof) may be formatted for (and prior to) transmission over a wireless communication link. In other contexts, allocated resources (e.g., channels, OFDM symbols, subcarrier frequencies, REs, and/or portions thereof) may be detected from (and subsequent to) reception over a wireless communication link.

With respect to various embodiments disclosed herein, for non-standalone NR scenarios, AC may be applied in a CONNECTED state (e.g., in an LTE and/or eLTE RRC_CONNECTED state). An eNB may broadcast per System Information Block (SIB) information (e.g., in an existing, legacy SIB or an additional SIB) for controlling UE-initiated traffic (e.g., data and/or signaling) in the CONNECTED state.

For barring UE-initiated traffic (e.g., data or signaling), a network may apply different approaches, such as by using QoS flow marking, or using categories of services and/or applications or bearers (including Signaling Radio Bearers (SRB) type bearers or DRB-type bearers), or using QoS associated with a given bearer.

For example, in cases using QoS flow marking, the following mapping may be used: a first service (e.g., a service having an index service-IdentityIndex) may correspond with a Guaranteed Bit Rate (GBR) flow and/or a first DRB; a second service may correspond with a GBR flow and/or a second DRB; a third service may correspond with a non-GBR flow and/or a third DRB; and a fourth service may correspond with a non-GBR flow and/or a fourth DRB; and so on.

As another example, in cases using categories of services and/or applications, the following mapping may be used: a first service (e.g., a service having an index service-IdentityIndex) may correspond with conversational voice (e.g., real-time); a second service may correspond with conversational video (real-time); a third service may correspond with real-time gaming; a fourth service may correspond with Internet Protocol Multimedia Subsystem (IMS) signaling; a fifth service may correspond with Hypertext Transfer Protocol (HTTP) based streaming; a sixth service may correspond with best-effort Transmission Control Protocol (TCP) traffic; and so on.

For various approaches disclosed herein, whether to configure barring information (e.g., AC) using a flag (e.g., having a first value indicating "barred," such as a value of "1," and/or a second value indicating "non-barred," such as a value of "0"), or using a barring factor and/or barring time, may be left to the network.

A UE that supports the service-specific AC in a CONNECTED state (e.g., in an LTE or (e)LTE RRC_CONNECTED state) may receive broadcast information from the eNB, and may determine which configured SRBs and/or DRBs may be affected by the barring information. If a configured SRB and/or DRB is affected, then traffic on it may be barred by the UE accordingly. Otherwise, the UE may continue data transmission on the configured SRB and/or DRB.

In a variety of embodiments, for standalone NR scenarios, an NR gNB may use a hierarchical or multi-level structure for provisioning AC parameters, such as in Table 1 below.

TABLE 1

Multi-level structure for provisioning of access control parameters

| Level 1 | Level 2 | Level 3 | Level 4 | Level 5 |
|---|---|---|---|---|
| common or per PLMN | per slice | call type (MO data and/or MO signaling) | barring type (device and/or service) | barring information (flag or factor/time) |

FIGS. 5A-5B illustrate a hierarchical Access Control (AC) parameter signaling structure, in accordance with some embodiments of the disclosure. A signaling structure 500 may comprise a signaling 510 (e.g., for a first level of signaling), a signaling 520 (e.g., for a second level of signaling), a signaling 530 (e.g., for a third level of signaling), a signaling 540 (e.g., for a fourth level of signaling), and both a signaling 551 and a signaling 552 (e.g., for a fifth level of signaling). Signaling structure 500 may be a suitable multi-level or hierarchical signaling structure, which may be advantageous for provisioning of AC parameters. For example, AC parameters may be established in common for all PLMNs, or may be established individually per PLMN sharing a RAN.

In some embodiments, for Level 4 signaling, it may be left to a network (e.g., a gNB) to determine whether to configure in the cell a single barring type (for barring of types of UEs or services), or to configure two barring types concurrently. In the latter case, a UE may be disposed to performing both checks sequentially, such as by first performing the check for device type and then performing the check for the service type.

For some embodiments, it may be possible that other types of barring may be disposed to being signaled and applied in addition to the MO data and signaling call types (e.g., for emergency calls).

In some embodiments, for Level 5 signaling, it may be left to a network to determine whether to configure barring information using a flag (e.g., having a first value indicating "barred," such as a value of "1," and a second value indicating "non-barred," such as a value of "0"), or using a barring factor/time, or using a barring bitmap, or using a combination of those approaches, depending on the barring aspect.

For some embodiments, a network may choose signaling options depending on a targeted use-case (e.g., vertical), QoS requirement, RRC state, and/or other factors.

Moreover, for each barring aspect, a network might choose the same mechanism for notifying UEs when a barring condition changes, or may choose different mechanisms. Exemplary ways that a UE might be made aware that AC conditions have changed include: (a) UEs may be notified (e.g., via broadcast messaging and/or paging, or via dedicated signaling), and/or (b) UEs might not be notified, and may be expected to check at a certain frequency (which may be left up to UE implementation, or may be left up to a higher-layer decision, or may be left up to lower layers based on a timer that might be specified or configured by the network).

In various embodiments, a variety of the aspects of AC might employ the same mechanisms and methods, or may employ different mechanisms and methods for at least some of the AC aspects disclosed herein (up to and including all of the AC aspects disclosed herein).

For some embodiments, for barring of services, a network may apply different approaches, such as by using QoS flow marking, or by using categories of services and/or applications.

For example, in cases using QoS flow marking, the following mapping may be used: a first service (e.g., a service having an index service-IdentityIndex) may correspond with a GBR flow and/or a first DRB; a second service may correspond with a GBR flow and a second DRB; a third service may correspond with a non-GBR flow and/or a third DRB; a fourth service may correspond with a non-GBR flow and/or a fourth DRB; and so on.

As another example, in cases using categories of services and/or applications, the following mapping may be used: a first service (e.g., a service having an index service-IdentityIndex) may correspond with conversational voice (e.g., real-time); a second service may correspond with conversational video (real-time); a third service may correspond with real-time gaming; a fourth service may correspond with IMS signaling; a fifth service may correspond with HTTP based streaming; a sixth service may correspond with best-effort TCP traffic; and so on.

In a variety of embodiments, for standalone NR scenarios, AC may be applied in all NR RRC states, such as an IDLE state (e.g., an RRC_IDLE state), an INACTIVE state (e.g., an RRC_ACTIVE state), and/or a CONNECTED state (e.g., an RRC_CONNECTED state). Whether to configure or enable AC for UEs in these states may be left to a network.

In some embodiments, in cases of IDLE state (e.g., RRC_IDLE), AC parameters may be broadcast by a gNB as part of minimum System Information (SI), such as when there may be no size constraints for the minimum SI. Otherwise, AC parameters may be broadcast by the gNB as part of other SI.

For some embodiments, in cases of INACTIVE state (e.g., RRC_INACTIVE state) and/or CONNECTED state (e.g., RRC_CONNECTED state), AC parameters may be broadcast by gNB as part of other SI, or may be transmitted via dedicated signaling.

Figure 6:
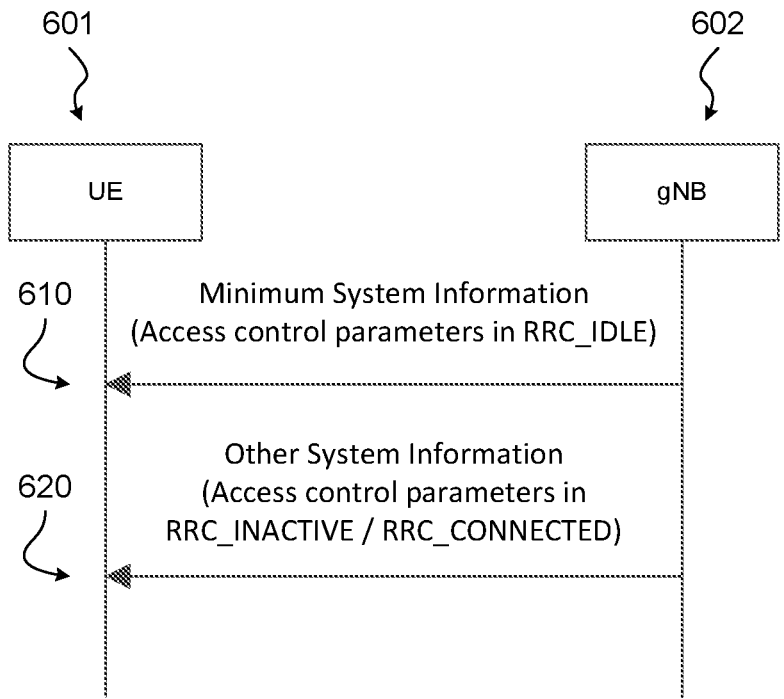
FIG. 6 illustrates a flow diagram for transmission of AC parameters for NR Radio Resource Control (RRC) states, in accordance with some embodiments of the disclosure.

FIG. 6 illustrates a flow diagram for transmission of AC parameters for NR RRC states, in accordance with some embodiments of the disclosure. A flow 600 between a UE 601 and a gNB 602 (e.g., an eNB) may comprise a portion 610 and/or a portion 620. In portion 610, minimum SI (along with associated AC parameters) may be transmitted by gNB 602 to UE 601, which may be in an IDLE state (e.g., RRC_IDLE). In portion 620, other SI (along with associated AC parameters) may be transmitted by gNB 602 to UE 601, which may be in an INACTIVE state (e.g., RRC_INACTIVE) or a CONNECTED state (e.g., RRC_CONNECTED).

Accordingly, AC parameters for various NR RRC states may be transmitted from gNB 602 to UE 601. For UEs in an IDLE state (e.g., RRC_IDLE), AC parameters may be broadcast by a gNB as part of a minimum SI, and for UEs in an INACTIVE state (e.g., RRC_INACTIVE) or a CONNECTED state (e.g., RRC_CONNECTED), AC parameters may be broadcast by the gNB as part of other SI.

In various embodiments, the minimum SI may comprise basic information required for initial access to a cell and information for acquiring any other SI broadcast periodically or provisioned via on-demand basis. The minimum SI may be broadcast periodically and may substantially always be present. The other SI may encompass everything not broadcast in the minimum SI. The other SI may either be broadcast periodically, or may be provisioned in a dedicated manner, either triggered by a network or upon request from a UE.

In a variety of embodiments, for standalone NR scenarios, an NR UE may receive broadcast information from a gNB and may determine whether it is affected by the barring information. If the UE is affected in an IDLE state (e.g., RRC_IDLE), an access attempt for RRC connection establishment may be barred accordingly. If affected in an INACTIVE state (e.g., RRC_INACTIVE) or a CONNECTED state (e.g., RRC_CONNECTED), a data transmission on a corresponding SRB and/or DRB may be barred by the UE accordingly.

Figure 7:
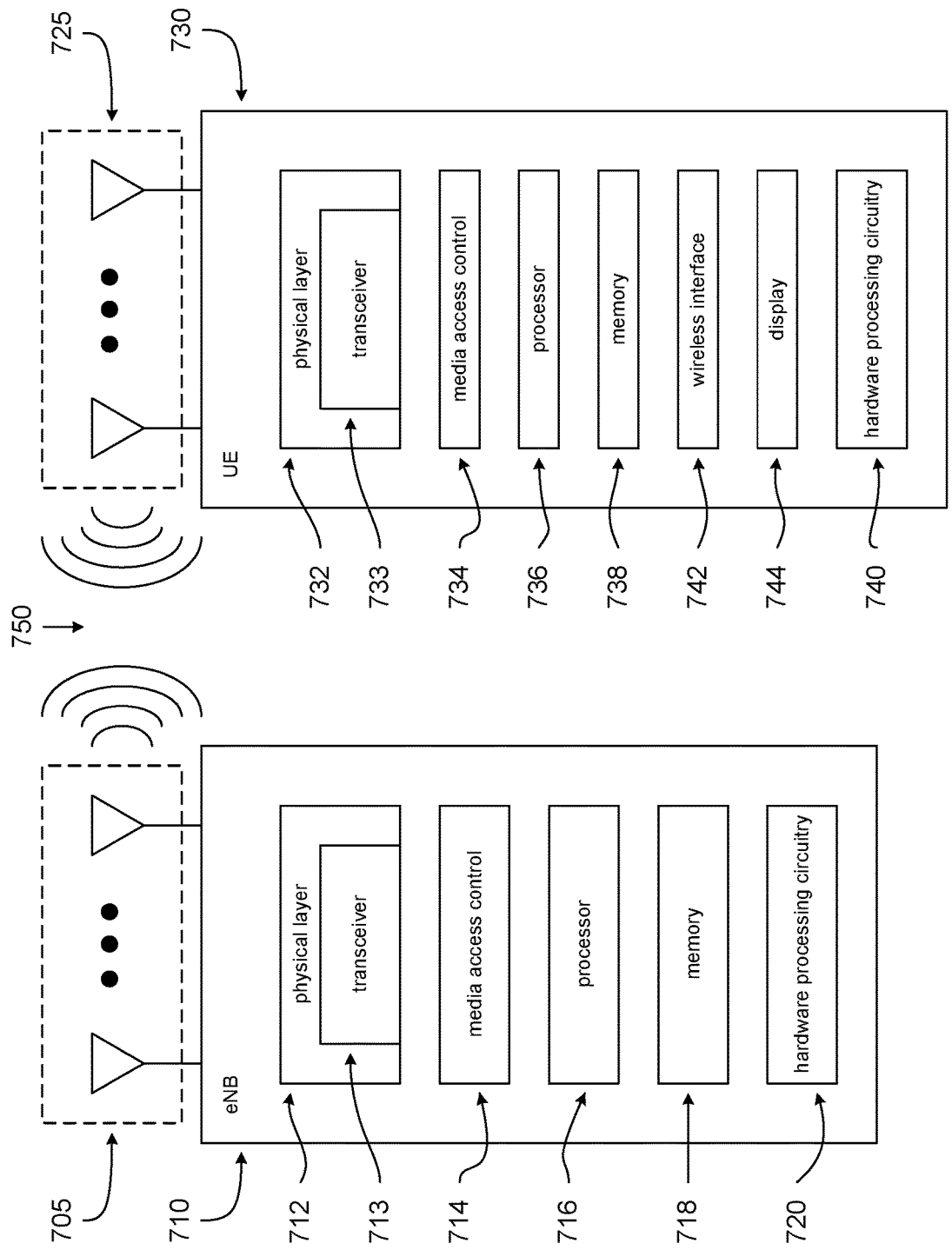
FIG. 7 illustrates an Evolved Node B (eNB) and a User Equipment (UE), in accordance with some embodiments of the disclosure.

FIG. 7 illustrates an eNB and a UE, in accordance with some embodiments of the disclosure. FIG. 7 includes block diagrams of an eNB 710 and a UE 730 which are operable to co-exist with each other and other elements of an LTE network. High-level, simplified architectures of eNB 710 and UE 730 are described so as not to obscure the embodiments. It should be noted that in some embodiments, eNB 710 may be a stationary non-mobile device.

eNB 710 is coupled to one or more antennas 705, and UE 730 is similarly coupled to one or more antennas 725. However, in some embodiments, eNB 710 may incorporate or comprise antennas 705, and UE 730 in various embodiments may incorporate or comprise antennas 725.

In some embodiments, antennas 705 and/or antennas 725 may comprise one or more directional or omni-directional antennas, including monopole antennas, dipole antennas, loop antennas, patch antennas, microstrip antennas, coplanar wave antennas, or other types of antennas suitable for transmission of RF signals. In some MIMO (multiple-input and multiple output) embodiments, antennas 705 are separated to take advantage of spatial diversity.

eNB 710 and UE 730 are operable to communicate with each other on a network, such as a wireless network. eNB 710 and UE 730 may be in communication with each other over a wireless communication channel 750, which has both a downlink path from eNB 710 to UE 730 and an uplink path from UE 730 to eNB 710.

As illustrated in FIG. 7, in some embodiments, eNB 710 may include a physical layer circuitry 712, a MAC (media access control) circuitry 714, a processor 716, a memory 718, and a hardware processing circuitry 720. A person skilled in the art will appreciate that other components not shown may be used in addition to the components shown to form a complete eNB.

In some embodiments, physical layer circuitry 712 includes a transceiver 713 for providing signals to and from UE 730. Transceiver 713 provides signals to and from UEs or other devices using one or more antennas 705. In some embodiments, MAC circuitry 714 controls access to the wireless medium. Memory 718 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Hardware processing circuitry 720 may comprise logic devices or circuitry to perform various operations. In some embodiments, processor 716 and memory 718 are arranged to perform the operations of hardware processing circuitry 720, such as operations described herein with reference to logic devices and circuitry within eNB 710 and/or hardware processing circuitry 720.

Accordingly, in some embodiments, eNB 710 may be a device comprising an application processor, a memory, one or more antenna ports, and an interface for allowing the application processor to communicate with another device.

As is also illustrated in FIG. 7, in some embodiments, UE 730 may include a physical layer circuitry 732, a MAC circuitry 734, a processor 736, a memory 738, a hardware processing circuitry 740, a wireless interface 742, and a display 744. A person skilled in the art would appreciate that other components not shown may be used in addition to the components shown to form a complete UE.

In some embodiments, physical layer circuitry 732 includes a transceiver 733 for providing signals to and from eNB 710 (as well as other eNBs). Transceiver 733 provides signals to and from eNBs or other devices using one or more antennas 725. In some embodiments, MAC circuitry 734 controls access to the wireless medium. Memory 738 may be, or may include, a storage media/medium such as a magnetic storage media (e.g., magnetic tapes or magnetic disks), an optical storage media (e.g., optical discs), an electronic storage media (e.g., conventional hard disk drives, solid-state disk drives, or flash-memory-based storage media), or any tangible storage media or non-transitory storage media. Wireless interface 742 may be arranged to allow the processor to communicate with another device. Display 744 may provide a visual and/or tactile display for a user to interact with UE 730, such as a touch-screen display. Hardware processing circuitry 740 may comprise logic devices or circuitry to perform various operations. In some embodiments, processor 736 and memory 738 may be arranged to perform the operations of hardware processing circuitry 740, such as operations described herein with reference to logic devices and circuitry within UE 730 and/or hardware processing circuitry 740.

Accordingly, in some embodiments, UE 730 may be a device comprising an application processor, a memory, one or more antennas, a wireless interface for allowing the application processor to communicate with another device, and a touch-screen display.

Elements of FIG. 7, and elements of other figures having the same names or reference numbers, can operate or function in the manner described herein with respect to any such figures (although the operation and function of such elements is not limited to such descriptions). For example, FIGS. 6-7 and 13-14 also depict embodiments of eNBs, hardware processing circuitry of eNBs, UEs, and/or hardware processing circuitry of UEs, and the embodiments described with respect to FIG. 7 and FIGS. 6-7 and 13-14 can operate or function in the manner described herein with respect to any of the figures.

In addition, although eNB 710 and UE 730 are each described as having several separate functional elements, one or more of the functional elements may be combined and may be implemented by combinations of software-configured elements and/or other hardware elements. In some embodiments of this disclosure, the functional elements can refer to one or more processes operating on one or more processing elements. Examples of software and/or hardware configured elements include Digital Signal Processors (DSPs), one or more microprocessors, DSPs, Field-Programmable Gate Arrays (FPGAs), Application Specific Integrated Circuits (ASICs), Radio-Frequency Integrated Circuits (RFICs), and so on.

Figure 8:
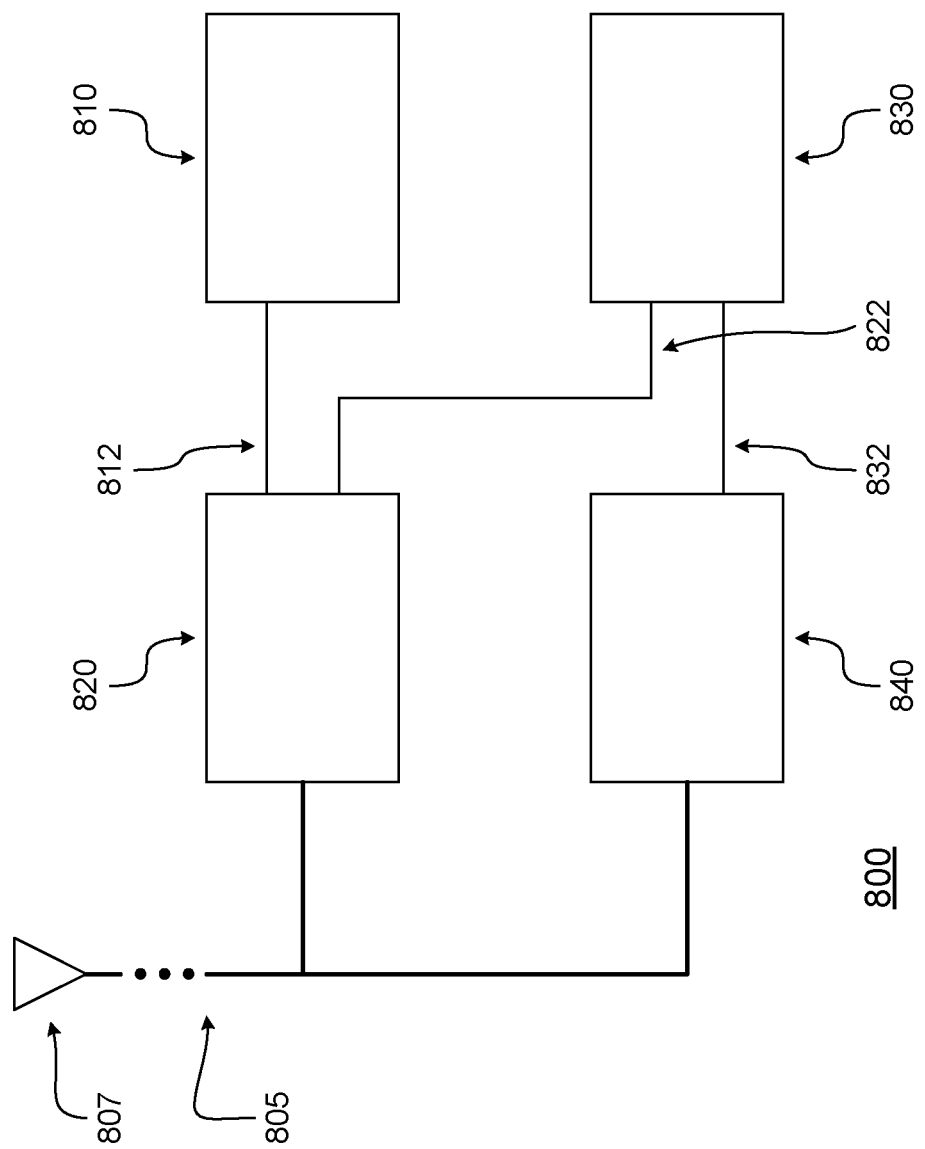
FIG. 8 illustrates hardware processing circuitries for a UE for AC, in accordance with some embodiments of the disclosure.

FIG. 8 illustrates hardware processing circuitries for a UE for AC, in accordance with some embodiments of the disclosure. With reference to FIG. 7, a UE may include various hardware processing circuitries discussed herein (such as hardware processing circuitry 800 of FIG. 8), which may in turn comprise logic devices and/or circuitry operable to perform various operations. For example, in FIG. 7, UE 730 (or various elements or components therein, such as hardware processing circuitry 740, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 736 (and/or one or more other processors which UE 730 may comprise), memory 738, and/or other elements or components of UE 730 (which may include hardware processing circuitry 740) may be arranged to perform the operations of these hardware processing circuitries, such as operations described herein with reference to devices and circuitry within these hardware processing circuitries. In some embodiments, processor 736 (and/or one or more other processors which UE 730 may comprise) may be a baseband processor.

Returning to FIG. 8, an apparatus of UE 730 (or another UE or mobile handset), which may be operable to communicate with one or more eNBs on a wireless network, may comprise hardware processing circuitry 800. In some embodiments, hardware processing circuitry 800 may comprise one or more antenna ports 805 operable to provide various transmissions over a wireless communication channel (such as wireless communication channel 750). Antenna ports 805 may be coupled to one or more antennas 807 (which may be antennas 725). In some embodiments, hardware processing circuitry 800 may incorporate antennas 807, while in other embodiments, hardware processing circuitry 800 may merely be coupled to antennas 807.

Antenna ports 805 and antennas 807 may be operable to provide signals from a UE to a wireless communications channel and/or an eNB, and may be operable to provide signals from an eNB and/or a wireless communications channel to a UE. For example, antenna ports 805 and antennas 807 may be operable to provide transmissions from UE 730 to wireless communication channel 750 (and from there to eNB 710, or to another eNB). Similarly, antennas 807 and antenna ports 805 may be operable to provide transmissions from a wireless communication channel 750 (and beyond that, from eNB 710, or another eNB) to UE 730.

Hardware processing circuitry 800 may comprise various circuitries operable in accordance with the various embodiments discussed herein. With reference to FIG. 8, hardware processing circuitry 800 may comprise a first circuitry 810, a second circuitry 820, a third circuitry 830, and/or a fourth circuitry 840.

In a variety of embodiments, first circuitry 810 may be operable to determine that the UE is in an Inactive RRC state. Second circuitry 820 may be operable to process a first transmission received by the UE while the UE is in the Inactive RRC state, the first transmission carrying a set of one or more AC parameters. First circuitry 810 may be operable to provide an indicator of the UE's RRC state to second circuitry 820 via an interface 812. Third circuitry 830 may be operable to regulate the sending of a second transmission, in accordance with the set of one or more AC parameters, while the UE is in the Inactive RRC state. Second circuitry 820 may be operable to provide one or more indicators regarding sets of one or more AC parameters to third circuitry 830 via an interface 822. Hardware processing circuitry 800 may comprise an interface for receiving the first transmission from a receiving circuitry and for regulating the sending of the second transmission to a transmission circuitry.

In some embodiments, the set of one or more AC parameters may have a hierarchical structure including one or more layers corresponding with a common or per PLMN level, a per network slice level, a call type level, a barring type level, and/or a barring parameter level.

For some embodiments, the set of one or more AC parameters is may be a first set of one or more AC parameters, and fourth circuitry 840 may be operable to generate a request transmission carrying a request that the eNB transmit a second set of one or more AC parameters. Third circuitry 830 may be operable to initiate the request for the second set of one or more AC parameters in fourth circuitry 840 via an interface 832.

In some embodiments, the set of one or more AC parameters may include, on a barring parameter level, a barring factor and/or a barring time. For some embodiments, the set of one or more AC parameters may include, on a barring parameter level, a barring flag and/or a barring bitmap. In some embodiments, the set of one or more AC parameters may include, on a barring type level, an IMS voice call type, an IMS video call type, an IMS signaling type, an emergency call type, a real-time gaming type, a Hypertext Transfer Protocol (HTTP) based streaming type, and/or a best-effort Transmission Control Protocol (TCP) traffic type.

For some embodiments, the set of one or more AC parameters may include, on a barring type level, a quality of service (QoS) flow marking based on a GBR flow and/or a non-GBR flow. In some embodiments, the first transmission may be a broadcast SI transmission.

In some embodiments, the set of one or more AC parameters may be a first set of one or more AC parameters, and first circuitry 810 may be additionally operable to determine that the UE is in an Idle RRC state. Second circuitry 820 may be additionally operable to process a third transmission received by the UE while the UE is in the Idle RRC state, the third transmission carrying a third set of one or more AC parameters. Third circuitry 830 may be additionally operable to regulate the generation of a fourth transmission, in accordance with the third set of one or more AC parameters, while the UE is in the Idle RRC state.

For some embodiments, the eNB may be a 5G wireless cellular communication system capable eNB (e.g., a gNB).

In a variety of embodiments, first circuitry 810 may be operable to determine that the UE is in an Inactive RRC state or Connected RRC state. Second circuitry 820 may be operable to process a first transmission received by the UE, the first transmission carrying a set of one or more AC parameters. First circuitry 810 may be operable to provide an indicator of the UE's RRC state to second circuitry 820 via an interface 812. Third circuitry 830 may be operable to regulate the sending of a second transmission, in accordance with the set of one or more AC parameters, while the UE is in the Inactive RRC state or the Connected RRC state. Second circuitry 820 may be operable to provide one or more indicators regarding sets of one or more AC parameters to third circuitry 830 via an interface 822. The set of one or more AC parameters has a hierarchical structure including one or more layers corresponding with a common or per PLMN level, a per network slice level, a call type level, a barring type level, and/or a barring parameter level. Hardware processing circuitry 800 may comprise an interface for receiving the first transmission from a receiving circuitry and for regulating the sending of the second transmission to a transmission circuitry.

For some embodiments, the set of one or more AC parameters is may be a first set of one or more AC parameters, and fourth circuitry 840 may be operable to generate a request transmission carrying a request that the eNB transmit a second set of one or more AC parameters. Third circuitry 830 may be operable to initiate the request for the second set of one or more AC parameters in fourth circuitry 840 via an interface 832.

In some embodiments, the set of one or more AC parameters may include, on a barring parameter level, a barring factor and/or a barring time. For some embodiments, the set of one or more AC parameters may include, on a barring parameter level, a barring flag and/or a barring bitmap. In some embodiments, the set of one or more AC parameters may include, on a barring type level, an IMS voice call type, an IMS video call type, an IMS signaling type, an emergency call type, a real-time gaming type, an HTTP based streaming type, and/or a best-effort TCP traffic type.

For some embodiments, the set of one or more AC parameters may include, on a barring type level, a QoS flow marking based on a GBR flow and/or a non-GBR flow. In some embodiments, the first transmission may be a broadcast SI transmission. For some embodiments, the first transmission may be a dedicated-signaling transmission.

In some embodiments, the set of one or more AC parameters may be a first set of one or more AC parameters. First circuitry 810 may be additionally operable to determine that the UE is in an Idle RRC state. Second circuitry 820 may be additionally operable to process a third transmission received by the UE while the UE is in the Idle RRC state, the third transmission carrying a third set of one or more AC parameters. Third circuitry 830 may be additionally operable to regulate the generation of a fourth transmission, in accordance with the third set of one or more AC parameters, while the UE is in the Idle RRC state.

In some embodiments, the set of one or more AC parameters may be a first set of one or more AC parameters. First circuitry 810 may be additionally operable to determine that the UE is in a Connected RRC state. Second circuitry 820 may be additionally operable to process a fifth transmission received by the UE while the UE is in the Idle RRC state or Connected RRC state, the fifth transmission carrying a fifth set of one or more AC parameters. Third circuitry 830 may be additionally operable to regulate the generation of a sixth transmission, in accordance with the fifth set of one or more AC parameters, while the UE is in the Idle RRC state.

For some embodiments, the eNB may be a 5G wireless cellular communication system capable eNB (e.g., a gNB).

In some embodiments, first circuitry 810, second circuitry 820, third circuitry 830, and/or fourth circuitry 840 may be implemented as separate circuitries. In other embodiments, first circuitry 810, second circuitry 820, third circuitry 830, and/or fourth circuitry 840 may be combined and implemented together in a circuitry without altering the essence of the embodiments.

Figure 9:
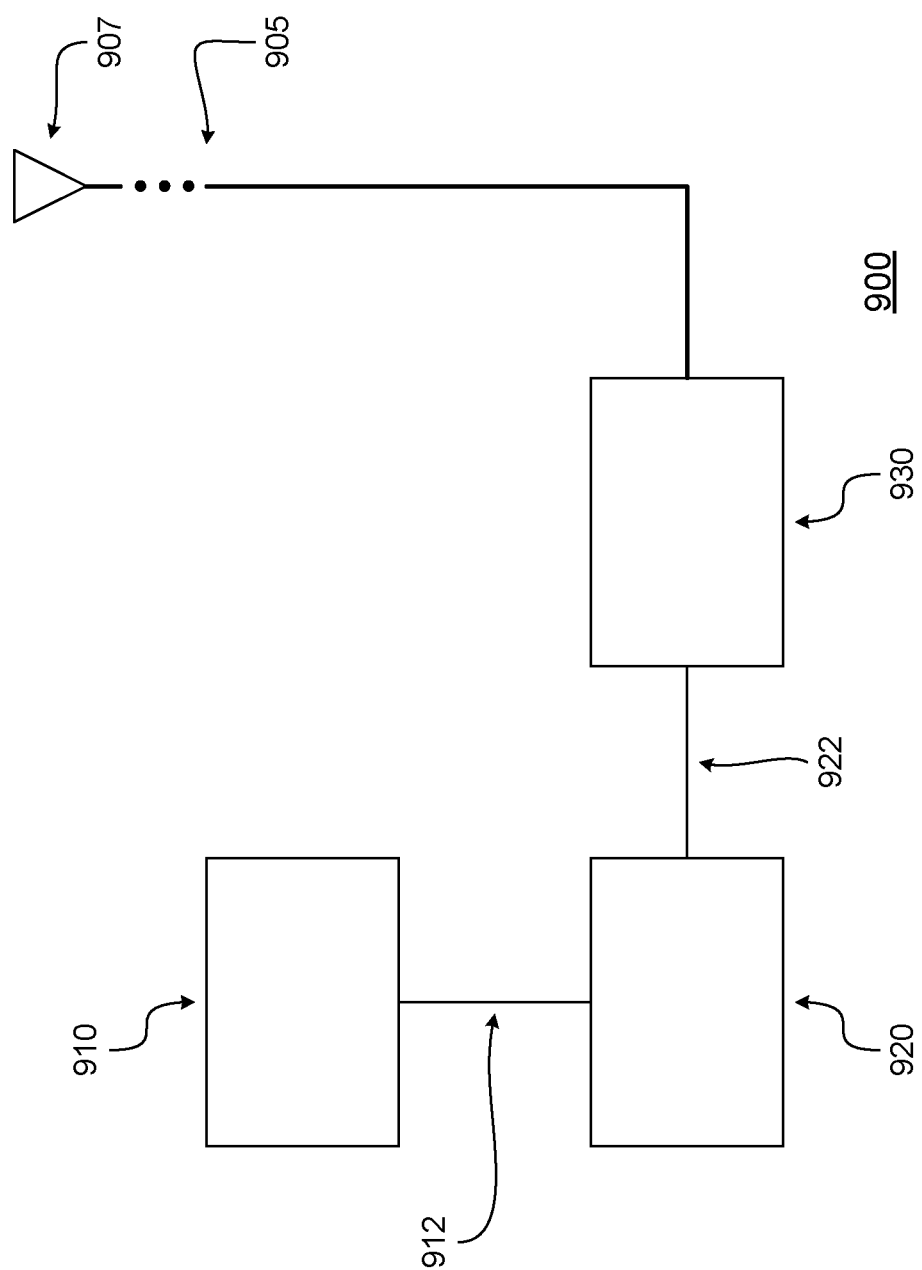
FIG. 9 illustrates hardware processing circuitries for an eNB for AC, in accordance with some embodiments of the disclosure.

FIG. 9 illustrates hardware processing circuitries for an eNB for AC, in accordance with some embodiments of the disclosure. With reference to FIG. 7, an eNB may include various hardware processing circuitries discussed herein (such as hardware processing circuitry 900 of FIG. 9), which may in turn comprise logic devices and/or circuitry operable to perform various operations. For example, in FIG. 7, eNB 710 (or various elements or components therein, such as hardware processing circuitry 720, or combinations of elements or components therein) may include part of, or all of, these hardware processing circuitries.

In some embodiments, one or more devices or circuitries within these hardware processing circuitries may be implemented by combinations of software-configured elements and/or other hardware elements. For example, processor 716 (and/or one or more other processors which eNB 710 may comprise), memory 718, and/or other elements or components of eNB 710 (which may include hardware processing circuitry 720) may be arranged to perform the operations of these hardware processing circuitries, such as operations described herein with reference to devices and circuitry within these hardware processing circuitries. In some embodiments, processor 716 (and/or one or more other processors which eNB 710 may comprise) may be a baseband processor.

Returning to FIG. 9, an apparatus of eNB 710 (or another eNB or base station), which may be operable to communicate with one or more UEs on a wireless network, may comprise hardware processing circuitry 900. In some embodiments, hardware processing circuitry 900 may comprise one or more antenna ports 905 operable to provide various transmissions over a wireless communication channel (such as wireless communication channel 750). Antenna ports 905 may be coupled to one or more antennas 907 (which may be antennas 705). In some embodiments, hardware processing circuitry 900 may incorporate antennas 907, while in other embodiments, hardware processing circuitry 900 may merely be coupled to antennas 907.

Antenna ports 905 and antennas 907 may be operable to provide signals from an eNB to a wireless communications channel and/or a UE, and may be operable to provide signals from a UE and/or a wireless communications channel to an eNB. For example, antenna ports 905 and antennas 907 may be operable to provide transmissions from eNB 710 to wireless communication channel 750 (and from there to UE 730, or to another UE). Similarly, antennas 907 and antenna ports 905 may be operable to provide transmissions from a wireless communication channel 750 (and beyond that, from UE 730, or another UE) to eNB 710.

Hardware processing circuitry 900 may comprise various circuitries operable in accordance with the various embodiments discussed herein. With reference to FIG. 9, hardware processing circuitry 900 may comprise a first circuitry 910, a second circuitry 920, and/or a third circuitry 930. First circuitry 910 may be operable to associate a cell served by the eNB with at least a first set of use cases and a second set of use cases. Second circuitry 920 may be operable to establish a first set of one or more AC parameters corresponding with the first set of use cases. Second circuitry 920 may also be operable to establish a second set of one or more AC parameters corresponding with the second set of use cases. First circuitry 910 may be operable to provide an indicator of the first set of use cases and/or the second set of use cases to second circuitry 920. Third circuitry 930 may be operable to generate a transmission carrying at least one of the first set of one or more AC parameters or the second set of one or more AC parameters. Second circuitry 920 may be operable to provide an indicator of the first set of one or more AC parameters and/or an indicator of the second set of one or more AC parameters to third circuitry 930 via an interface 922. Hardware processing circuitry 900 may comprise an interface for sending the transmission to a transmission circuitry.

In some embodiments, the transmission may be a first transmission, and third circuitry 930 may be additionally operable to generate a second transmission carrying the second set of one or more AC parameters.

For some embodiments, at least one of the first set of use cases or the second set of use cases may include includes an eMBB use case, a mMTC use case, and/or a URLLC use case. In some embodiments, at least one of the first set of one or more AC parameters or the second set of one or more AC parameters has a hierarchical structure including one or more layers corresponding with one or more of: a common or per PLMN level; a per network slice level; a call type level; a barring type level; or a barring parameter level. For some embodiments, at least one of the first set of one or more AC parameters or the second set of one or more AC parameters includes at least one of: a barring factor or a barring time.

In some embodiments, the first set of one or more AC parameters may have a hierarchical structure including at least a first per network slice level, and a first barring parameter level including a first barring factor, the second set of one or more AC parameters may have a hierarchical structure including at least a second per network slice level, and a second barring parameter level including a second barring factor, and the first barring factor may be greater than the second barring factor.

For some embodiments, the first set of one or more AC parameters may have a hierarchical structure including at least a first barring type level corresponding with a first service, and a first barring parameter level including a first barring factor; the second set of one or more AC parameters may have a hierarchical structure including at least a second barring type level corresponding with a second service, and a second barring parameter level including a second barring factor; and the first barring factor may be greater than the second barring factor.

In some embodiments, the first set of one or more AC parameters may include at least a first service identity index and a first barring factor, the second set of one or more AC parameters may include at least a second service identity index and a second barring factor, and the first barring factor may be greater than the second barring factor. For some embodiments, the eNB may be a 5G wireless cellular communication system capable eNB.

In some embodiments, first circuitry 910, second circuitry 920, and/or third circuitry 930 may be implemented as separate circuitries. In other embodiments, first circuitry 910, second circuitry 920, and/or third circuitry 930 may be combined and implemented together in a circuitry without altering the essence of the embodiments.

Figure 10:
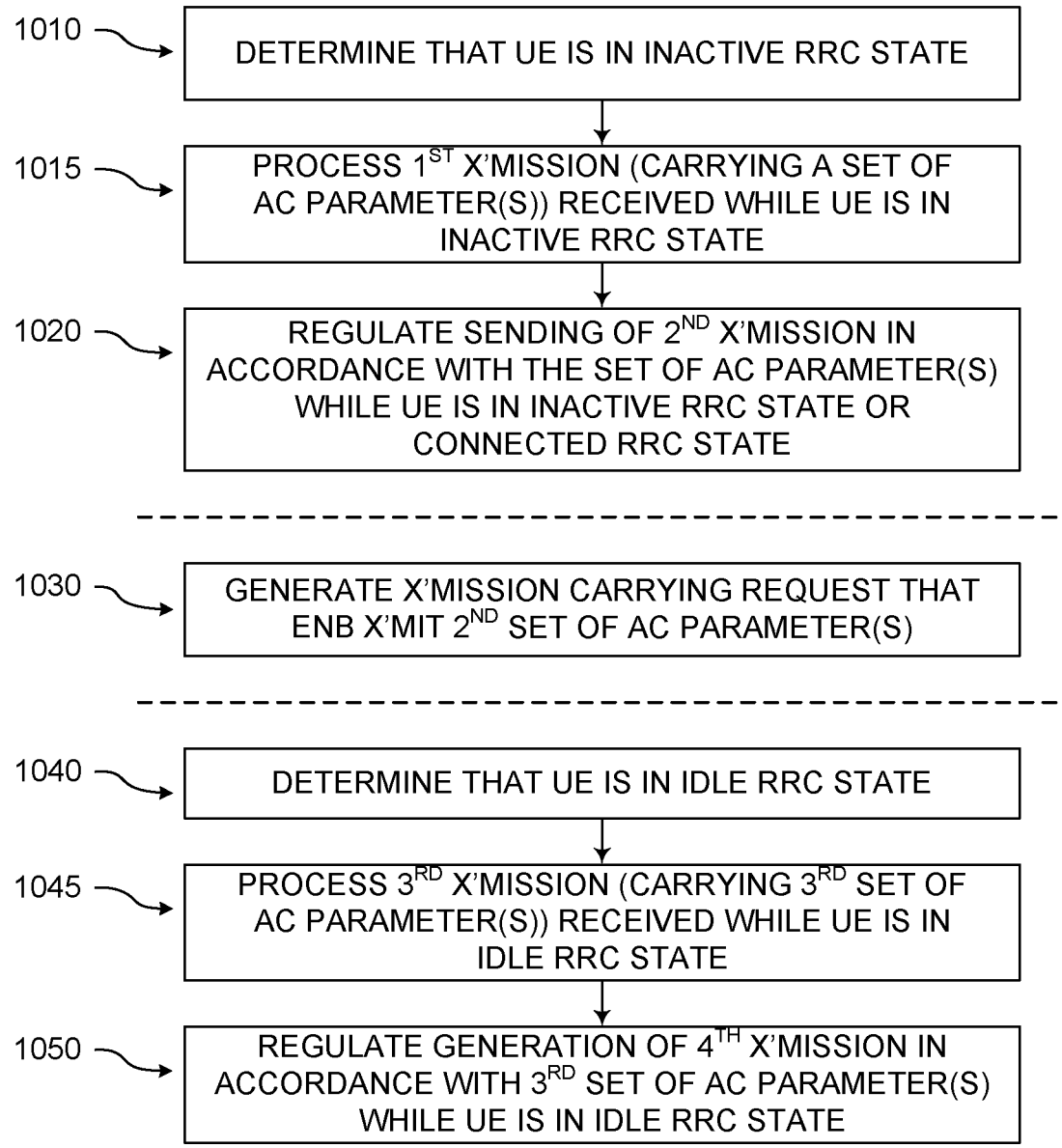
FIG. 10 illustrates methods for a UE for AC, in accordance with some embodiments of the disclosure.
Figure 11:
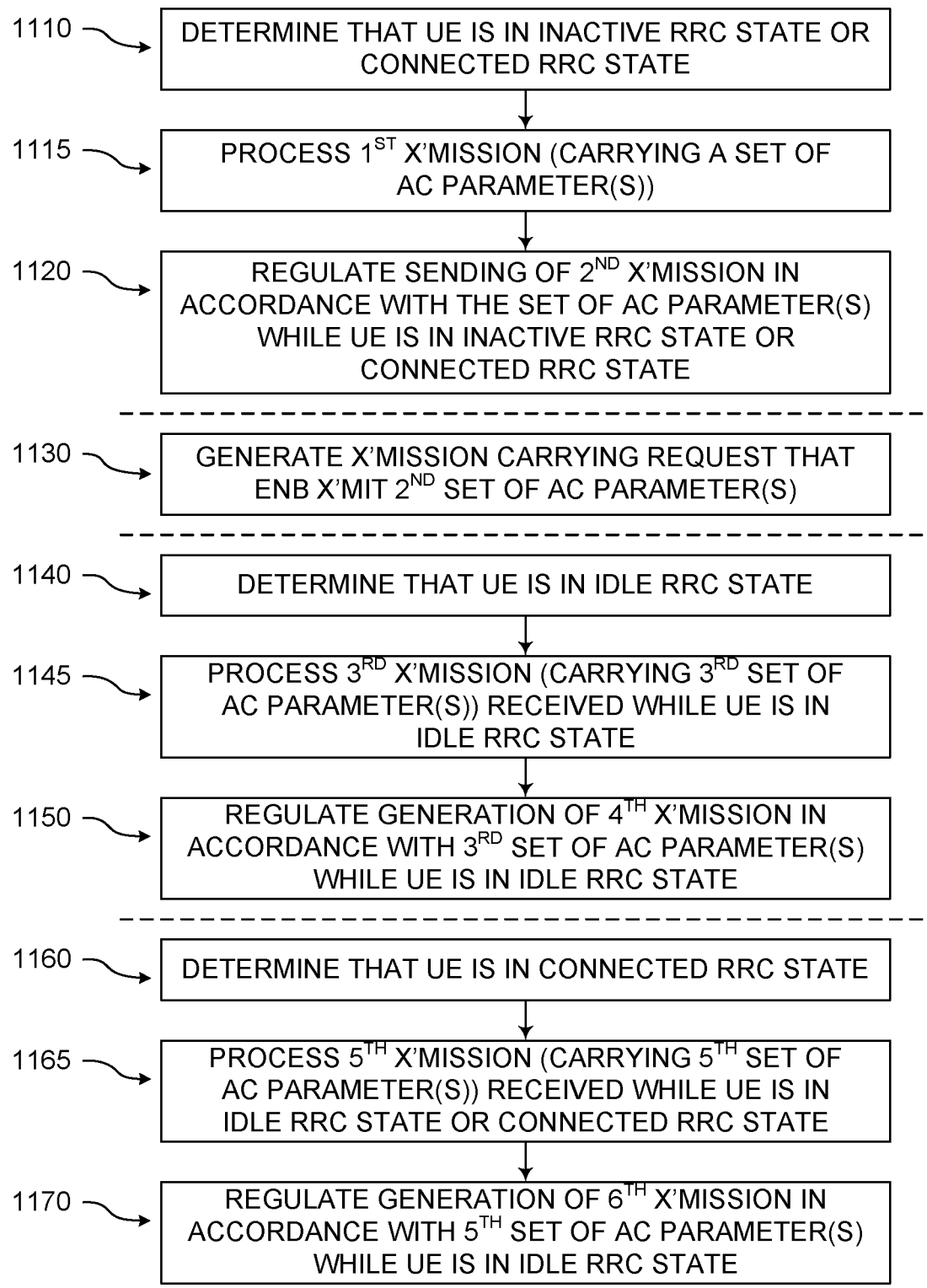
FIG. 11 illustrates methods for a UE for AC, in accordance with some embodiments of the disclosure.

FIG. 10 illustrates methods for a UE for AC, in accordance with some embodiments of the disclosure. FIG. 11 illustrates methods for a UE for AC, in accordance with some embodiments of the disclosure. With reference to FIG. 7, methods that may relate to UE 730 and hardware processing circuitry 740 are discussed herein. Although the actions in method 1000 of FIG. 10 and method 1100 of FIG. 11 are shown in a particular order, the order of the actions can be modified. Thus, the illustrated embodiments can be performed in a different order, and some actions may be performed in parallel. Some of the actions and/or operations listed in FIGS. 10-11 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause UE 730 and/or hardware processing circuitry 740 to perform an operation comprising the methods of FIGS. 10-11. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIGS. 10-11.

Returning to FIG. 10, various methods may be in accordance with the various embodiments discussed herein. A method 1000 may comprise a determining 1010, a processing 1015, and a regulating 1020. Method 1000 may also comprise a generating 1030, a determining 1040, a processing 1045, and/or a regulating 1050.

In determining 1010, it may be determined the UE is in an RRC state. In processing 1015, a first transmission received by the UE while the UE is in the Inactive RRC state may be processed, the first transmission carrying a set of one or more AC parameters. In regulating 1020, the sending of a second transmission may be regulated, in accordance with the set of one or more AC parameters, while the UE is in the Inactive RRC state.

In some embodiments, the set of one or more AC parameters may have a hierarchical structure including one or more layers corresponding with a common or per PLMN level, a per network slice level, a call type level, a barring type level, and/or a barring parameter level.

For some embodiments, in generating 1030, a request transmission carrying a request that the eNB transmit a second set of one or more AC parameters may be generated.

In some embodiments, the set of one or more AC parameters may include, on a barring parameter level, a barring factor and/or a barring time. For some embodiments, the set of one or more AC parameters may include, on a barring parameter level, a barring flag and/or a barring bitmap. In some embodiments, the set of one or more AC parameters may include, on a barring type level, an IMS voice call type, an IMS video call type, an IMS signaling type, an emergency call type, a real-time gaming type, a Hypertext Transfer Protocol (HTTP) based streaming type, and/or a best-effort Transmission Control Protocol (TCP) traffic type.

For some embodiments, the set of one or more AC parameters may include, on a barring type level, a quality of service (QoS) flow marking based on a GBR flow and/or a non-GBR flow. In some embodiments, the first transmission may be a broadcast SI transmission.

In some embodiments, the set of one or more AC parameters may be a first set of one or more AC parameters, and in a determining 1040, the UE may be determined to be in an Idle RRC state. In processing 1045, a third transmission received by the UE while the UE is in the Idle RRC state may be processed, the third transmission carrying a third set of one or more AC parameters. In regulating 1050, the generation of a fourth transmission may be regulated, in accordance with the third set of one or more AC parameters, while the UE is in the Idle RRC state.

For some embodiments, the eNB may be a 5G wireless cellular communication system capable eNB (e.g., a gNB).

Returning to FIG. 11, various methods may be in accordance with the various embodiments discussed herein. A method 1100 may comprise a determining 1110, a processing 1115, and a regulating 1120. Method 1100 may also comprise a generating 1130, a determining 1140, a processing 1145, a regulating 1150, a determining 1160, a processing 1165, and/or a regulating 1170. In determining 1110, it may be determined that the UE is in an Inactive RRC state or Connected RRC state. In processing 1115, a first transmission received by the UE may be processed, the first transmission carrying a set of one or more AC parameters. In regulating 1120, the sending of a second transmission may be regulated, in accordance with the set of one or more AC parameters, while the UE is in the Inactive RRC state or the Connected RRC state. The set of one or more AC parameters may have a hierarchical structure including one or more layers corresponding with a common or per PLMN level, a per network slice level, a call type level, a barring type level, and/or a barring parameter level.

For some embodiments, the set of one or more AC parameters is may be a first set of one or more AC parameters, and in generating 1130, a request transmission carrying a request that the eNB transmit a second set of one or more AC parameters may be generated.

In some embodiments, the set of one or more AC parameters may include, on a barring parameter level, a barring factor and/or a barring time. For some embodiments, the set of one or more AC parameters may include, on a barring parameter level, a barring flag and/or a barring bitmap. In some embodiments, the set of one or more AC parameters may include, on a barring type level, an IMS voice call type, an IMS video call type, an IMS signaling type, an emergency call type, a real-time gaming type, an HTTP based streaming type, and/or a best-effort TCP traffic type.

For some embodiments, the set of one or more AC parameters may include, on a barring type level, a QoS flow marking based on a GBR flow and/or a non-GBR flow. In some embodiments, the first transmission may be a broadcast SI transmission. For some embodiments, the first transmission may be a dedicated-signaling transmission.

In some embodiments, the set of one or more AC parameters may be a first set of one or more AC parameters. In determining 1140, it may be determined that the UE is in an Idle RRC state. In processing 1145, a third transmission received by the UE while the UE is in the Idle RRC state may be processed, the third transmission carrying a third set of one or more AC parameters. In regulating 1150, the generation of a fourth transmission may be regulated, in accordance with the third set of one or more AC parameters, while the UE is in the Idle RRC state.

In some embodiments, the set of one or more AC parameters may be a first set of one or more AC parameters. In determining 1160, it may be determined that the UE is in a Connected RRC state. In processing 1165, a fifth transmission received by the UE while the UE is in the Idle RRC state or Connected RRC state may be processed, the fifth transmission carrying a fifth set of one or more AC parameters. In regulating 1170, the generation of a sixth transmission may be regulated, in accordance with the fifth set of one or more AC parameters, while the UE is in the Idle RRC state.

For some embodiments, the eNB may be a 5G wireless cellular communication system capable eNB (e.g., a gNB).

Figure 12:
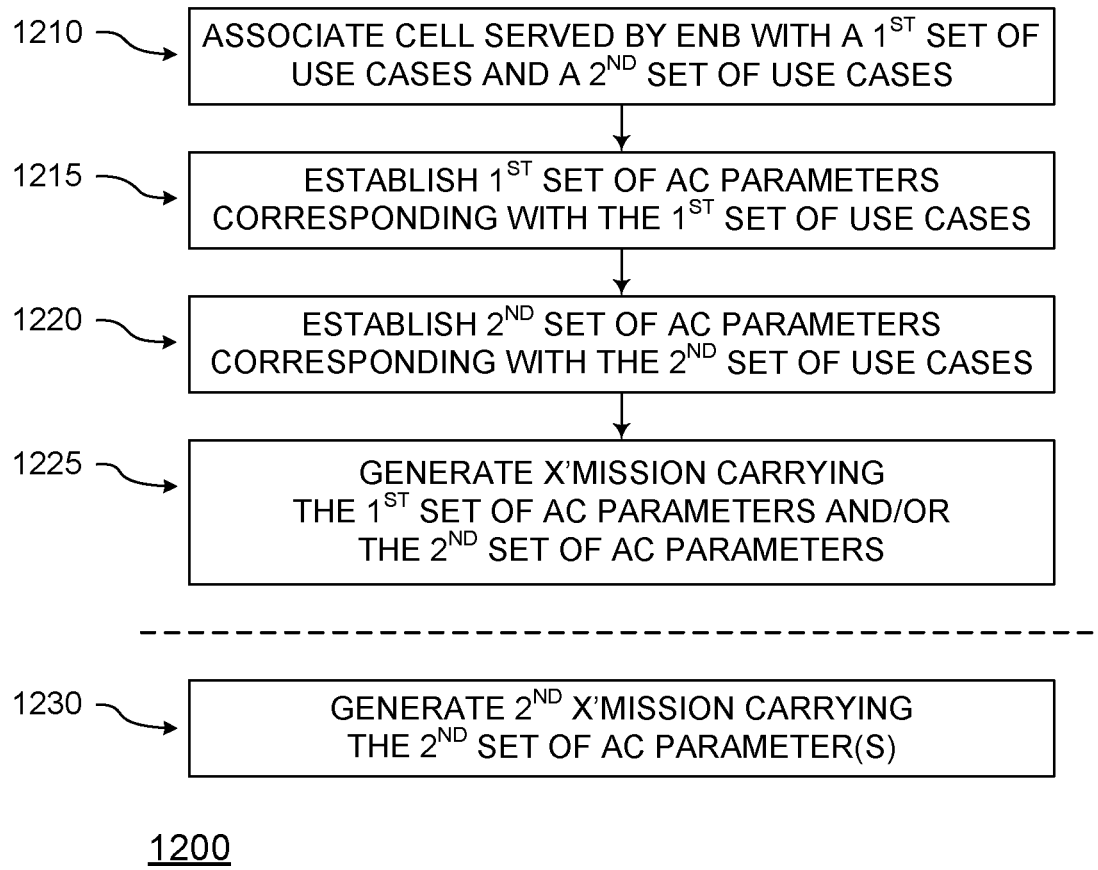
FIG. 12 illustrates methods for an eNB for AC, in accordance with some embodiments of the disclosure.

FIG. 12 illustrates methods for an eNB for AC, in accordance with some embodiments of the disclosure. With reference to FIG. 7, various methods that may relate to eNB 710 and hardware processing circuitry 720 are discussed herein. Although the actions in method 1200 of FIG. 12 are shown in a particular order, the order of the actions can be modified. Thus, the illustrated embodiments can be performed in a different order, and some actions may be performed in parallel. Some of the actions and/or operations listed in FIG. 12 are optional in accordance with certain embodiments. The numbering of the actions presented is for the sake of clarity and is not intended to prescribe an order of operations in which the various actions must occur. Additionally, operations from the various flows may be utilized in a variety of combinations.

Moreover, in some embodiments, machine readable storage media may have executable instructions that, when executed, cause eNB 710 and/or hardware processing circuitry 720 to perform an operation comprising the methods of FIG. 12. Such machine readable storage media may include any of a variety of storage media, like magnetic storage media (e.g., magnetic tapes or magnetic disks), optical storage media (e.g., optical discs), electronic storage media (e.g., conventional hard disk drives, solid-state disk drives, or flash-memory-based storage media), or any other tangible storage media or non-transitory storage media.

In some embodiments, an apparatus may comprise means for performing various actions and/or operations of the methods of FIG. 12.

Returning to FIG. 12, various methods may be in accordance with the various embodiments discussed herein. A method 1200 may comprise an associating 1210, an establishing 1215, an establishing 1220, and a generating 1225. Method 1200 may also comprise a generating 1230. In associating 1210, a cell served by the eNB may be associated with at least a first set of use cases and a second set of use cases. In establishing 1215, a first set of one or more AC parameters corresponding with the first set of use cases may be established. In establishing 1220, a second set of one or more AC parameters corresponding with the second set of use cases may be established. In generating 1225, a transmission carrying at least one of the first set of one or more AC parameters or the second set of one or more AC parameters may be generated.

In some embodiments, the transmission may be a first transmission, and in generating 1230, a second transmission carrying the second set of one or more AC parameters may be generated.

For some embodiments, at least one of the first set of use cases or the second set of use cases may include includes an eMBB use case, a mMTC use case, and/or a URLLC use case. In some embodiments, at least one of the first set of one or more AC parameters or the second set of one or more AC parameters has a hierarchical structure including one or more layers corresponding with one or more of: a common or per PLMN level; a per network slice level; a call type level; a barring type level; or a barring parameter level. For some embodiments, at least one of the first set of one or more AC parameters or the second set of one or more AC parameters includes at least one of: a barring factor or a barring time.

In some embodiments, the first set of one or more AC parameters may have a hierarchical structure including at least a first per network slice level, and a first barring parameter level including a first barring factor, the second set of one or more AC parameters may have a hierarchical structure including at least a second per network slice level, and a second barring parameter level including a second barring factor, and the first barring factor may be greater than the second barring factor.

For some embodiments, the first set of one or more AC parameters may have a hierarchical structure including at least a first barring type level corresponding with a first service, and a first barring parameter level including a first barring factor; the second set of one or more AC parameters may have a hierarchical structure including at least a second barring type level corresponding with a second service, and a second barring parameter level including a second barring factor; and the first barring factor may be greater than the second barring factor.

In some embodiments, the first set of one or more AC parameters may include at least a first service identity index and a first barring factor, the second set of one or more AC parameters may include at least a second service identity index and a second barring factor, and the first barring factor may be greater than the second barring factor. For some embodiments, the eNB may be a 5G wireless cellular communication system capable eNB.

Figure 13:
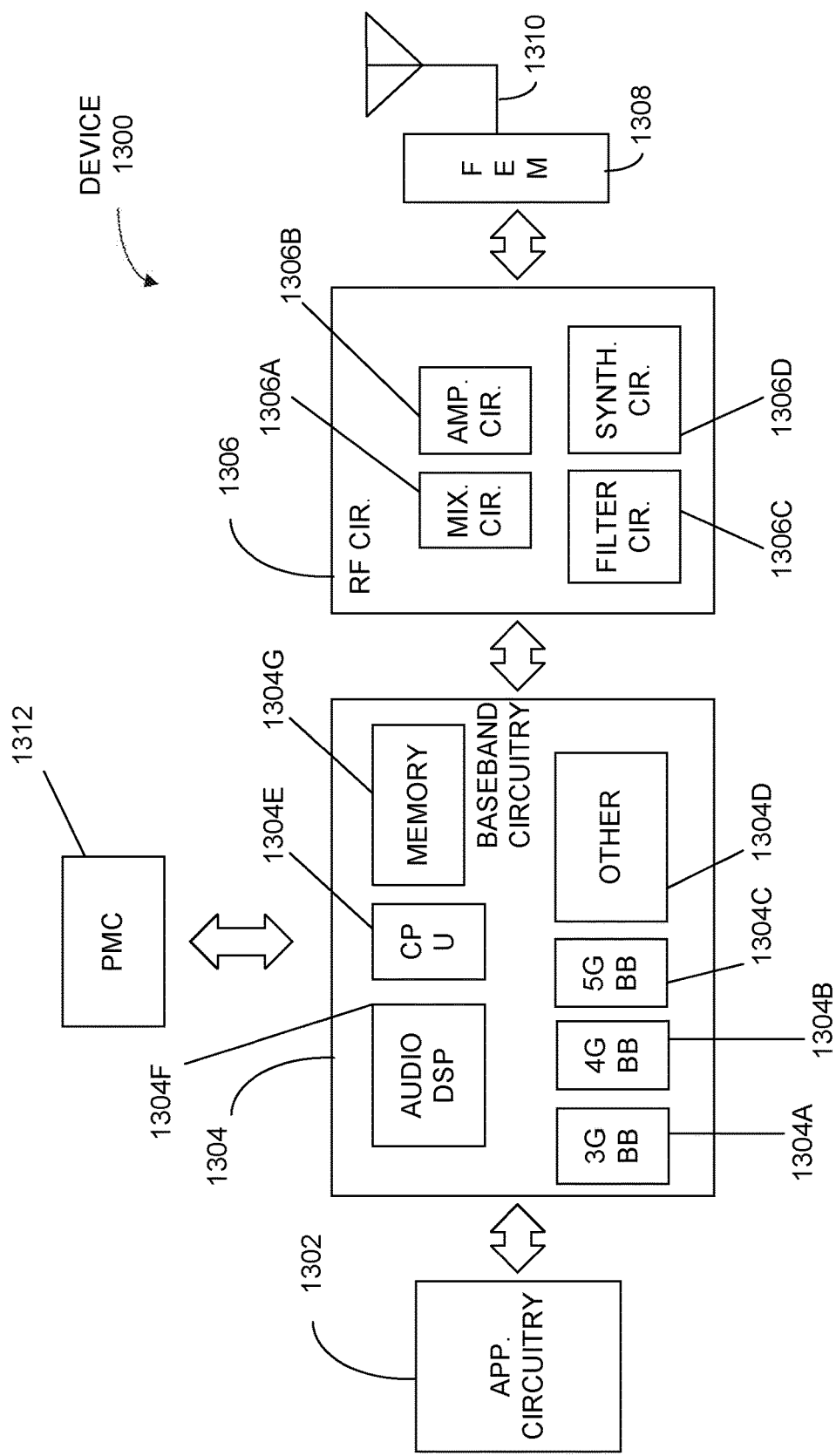
FIG. 13 illustrates example components of a device, in accordance with some embodiments of the disclosure.

FIG. 13 illustrates example components of a device, in accordance with some embodiments of the disclosure. In some embodiments, the device 1300 may include application circuitry 1302, baseband circuitry 1304, Radio Frequency (RF) circuitry 1306, front-end module (FEM) circuitry 1308, one or more antennas 1310, and power management circuitry (PMC) 1312 coupled together at least as shown. The components of the illustrated device 1300 may be included in a UE or a RAN node. In some embodiments, the device 1300 may include less elements (e.g., a RAN node may not utilize application circuitry 1302, and instead include a processor/controller to process IP data received from an EPC). In some embodiments, the device 1300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, and so on). The processors may be coupled with or may include memory/storage and may be configured to execute instructions stored in the memory/storage to enable various applications or operating systems to run on the device 1300. In some embodiments, processors of application circuitry 1302 may process IP data packets received from an EPC.

The baseband circuitry 1304 may include circuitry such as, but not limited to, one or more single-core or multi-core processors. The baseband circuitry 1304 may include one or more baseband processors or control logic to process baseband signals received from a receive signal path of the RF circuitry 1306 and to generate baseband signals for a transmit signal path of the RF circuitry 1306. Baseband processing circuitry 1304 may interface with the application circuitry 1302 for generation and processing of the baseband signals and for controlling operations of the RF circuitry 1306. For example, in some embodiments, the baseband circuitry 1304 may include a third generation (3G) baseband processor 1304A, a fourth generation (4G) baseband processor 1304B, a fifth generation (5G) baseband processor 1304C, or other baseband processor(s) 1304D for other existing generations, generations in development or to be developed in the future (e.g., second generation (2G), sixth generation (6G), and so on). The baseband circuitry 1304 (e.g., one or more of baseband processors 1304A-D) may handle various radio control functions that enable communication with one or more radio networks via the RF circuitry 1306. In other embodiments, some or all of the functionality of baseband processors 1304A-D may be included in modules stored in the memory 1304G and executed via a Central Processing Unit (CPU) 1304E. The radio control functions may include, but are not limited to, signal modulation/demodulation, encoding/decoding, radio frequency shifting, and so on. In some embodiments, modulation/demodulation circuitry of the baseband circuitry 1304 may include Fast-Fourier Transform (FFT), precoding, or constellation mapping/demapping functionality. In some embodiments, encoding/decoding circuitry of the baseband circuitry 1304 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include one or more audio digital signal processor(s) (DSP) 1304F. The audio DSP(s) 1304F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1304 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, and so on to facilitate the communication with the wireless network. RF circuitry 1306 may include a receive signal path which may include circuitry to down-convert RF signals received from the FEM circuitry 1308 and provide baseband signals to the baseband circuitry 1304. RF circuitry 1306 may also include a transmit signal path which may include circuitry to up-convert baseband signals provided by the baseband circuitry 1304 and provide RF output signals to the FEM circuitry 1308 for transmission.

In some embodiments, the receive signal path of the RF circuitry 1306 may include mixer circuitry 1306A, amplifier circuitry 1306B and filter circuitry 1306C. In some embodiments, the transmit signal path of the RF circuitry 1306 may include filter circuitry 1306C and mixer circuitry 1306A. RF circuitry 1306 may also include synthesizer circuitry 1306D for synthesizing a frequency for use by the mixer circuitry 1306A of the receive signal path and the transmit signal path. In some embodiments, the mixer circuitry 1306A of the receive signal path may be configured to down-convert RF signals received from the FEM circuitry 1308 based on the synthesized frequency provided by synthesizer circuitry 1306D. The amplifier circuitry 1306B may be configured to amplify the down-converted signals and the filter circuitry 1306C may be a low-pass filter (LPF) or band-pass filter (BPF) configured to remove unwanted signals from the down-converted signals to generate output baseband signals. Output baseband signals may be provided to the baseband circuitry 1304 for further processing. In some embodiments, the output baseband signals may be zero-frequency baseband signals, although this is not a requirement. In some embodiments, mixer circuitry 1306A of the receive signal path may comprise passive mixers, although the scope of the embodiments is not limited in this respect.

In some embodiments, the mixer circuitry 1306A of the transmit signal path may be configured to up-convert input baseband signals based on the synthesized frequency provided by the synthesizer circuitry 1306D to generate RF output signals for the FEM circuitry 1308. The baseband signals may be provided by the baseband circuitry 1304 and may be filtered by filter circuitry 1306C.

In some embodiments, the mixer circuitry 1306A of the receive signal path and the mixer circuitry 1306A of the transmit signal path may include two or more mixers and may be arranged for quadrature downconversion and upconversion, respectively. In some embodiments, the mixer circuitry 1306A of the receive signal path and the mixer circuitry 1306A of the transmit signal path may include two or more mixers and may be arranged for image rejection (e.g., Hartley image rejection). In some embodiments, the mixer circuitry 1306A of the receive signal path and the mixer circuitry 1306A may be arranged for direct downconversion and direct upconversion, respectively. In some embodiments, the mixer circuitry 1306A of the receive signal path and the mixer circuitry 1306A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306D may be a fractional-N synthesizer or a fractional N/N+1 synthesizer, although the scope of the embodiments is not limited in this respect as other types of frequency synthesizers may be suitable. For example, synthesizer circuitry 1306D may be a delta-sigma synthesizer, a frequency multiplier, or a synthesizer comprising a phase-locked loop with a frequency divider.

The synthesizer circuitry 1306D may be configured to synthesize an output frequency for use by the mixer circuitry 1306A of the RF circuitry 1306 based on a frequency input and a divider control input. In some embodiments, the synthesizer circuitry 1306D may be a fractional N/N+1 synthesizer.

In some embodiments, frequency input may be provided by a voltage controlled oscillator (VCO), although that is not a requirement. Divider control input may be provided by either the baseband circuitry 1304 or the applications processor 1302 depending on the desired output frequency. In some embodiments, a divider control input (e.g., N) may be determined from a look-up table based on a channel indicated by the applications processor 1302.

Synthesizer circuitry 1306D of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

FEM circuitry 1308 may include a receive signal path which may include circuitry configured to operate on RF signals received from one or more antennas 1310, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310. In various embodiments, the amplification through the transmit or receive signal paths may be done solely in the RF circuitry 1306, solely in the FEM 1308, or in both the RF circuitry 1306 and the FEM 1308.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310).

In some embodiments, the PMC 1312 may manage power provided to the baseband circuitry 1304. In particular, the PMC 1312 may control power-source selection, voltage scaling, battery charging, or DC-to-DC conversion. The PMC 1312 may often be included when the device 1300 is capable of being powered by a battery, for example, when the device is included in a UE. The PMC 1312 may increase the power conversion efficiency while providing desirable implementation size and heat dissipation characteristics.

While FIG. 13 shows the PMC 1312 coupled only with the baseband circuitry 1304. However, in other embodiments, the PMC 1312 may be additionally or alternatively coupled with, and perform similar power management operations for, other components such as, but not limited to, application circuitry 1302, RF circuitry 1306, or FEM 1308.

In some embodiments, the PMC 1312 may control, or otherwise be part of, various power saving mechanisms of the device 1300. For example, if the device 1300 is in an RRC_Connected state, where it is still connected to the RAN node as it expects to receive traffic shortly, then it may enter a state known as Discontinuous Reception Mode (DRX) after a period of inactivity. During this state, the device 1300 may power down for brief intervals of time and thus save power.

If there is no data traffic activity for an extended period of time, then the device 1300 may transition off to an RRC_Idle state, where it disconnects from the network and does not perform operations such as channel quality feedback, handover, and so on. The device 1300 goes into a very low power state and it performs paging where again it periodically wakes up to listen to the network and then powers down again. The device 1300 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1302 and processors of the baseband circuitry 1304 may be used to execute elements of one or more instances of a protocol stack. For example, processors of the baseband circuitry 1304, alone or in combination, may be used execute Layer 3, Layer 2, or Layer 1 functionality, while processors of the application circuitry 1304 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 14:
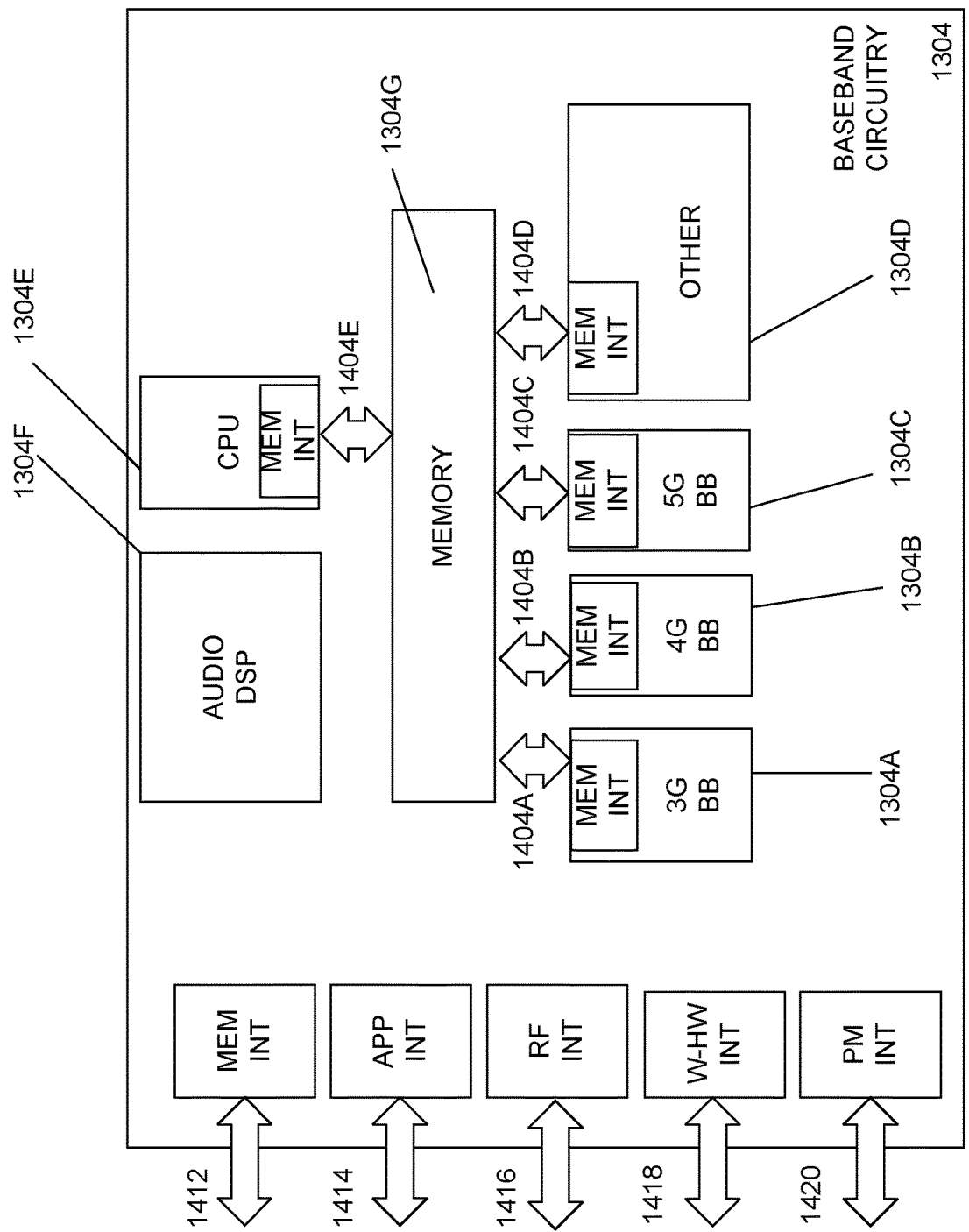
FIG. 14 illustrates example interfaces of baseband circuitry, in accordance with some embodiments of the disclosure.

FIG. 14 illustrates example interfaces of baseband circuitry, in accordance with some embodiments of the disclosure. As discussed above, the baseband circuitry 1304 of FIG. 13 may comprise processors 1304A-1304E and a memory 1304G utilized by said processors. Each of the processors 1304A-1304E may include a memory interface, 1404A-1404E, respectively, to send/receive data to/from the memory 1304G.

The baseband circuitry 1304 may further include one or more interfaces to communicatively couple to other circuitries/devices, such as a memory interface 1412 (e.g., an interface to send/receive data to/from memory external to the baseband circuitry 1304), an application circuitry interface 1414 (e.g., an interface to send/receive data to/from the application circuitry 1302 of FIG. 13), an RF circuitry interface 1416 (e.g., an interface to send/receive data to/from RF circuitry 1306 of FIG. 13), a wireless hardware connectivity interface 1418 (e.g., an interface to send/receive data to/from Near Field Communication (NFC) components, Bluetooth® components (e.g., Bluetooth® Low Energy), Wi-Fi® components, and other communication components), and a power management interface 1420 (e.g., an interface to send/receive power or control signals to/from the PMC 1312.

It is pointed out that elements of any of the Figures herein having the same reference numbers and/or names as elements of any other Figure herein may, in various embodiments, operate or function in a manner similar those elements of the other Figure (without being limited to operating or functioning in such a manner).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1 provides an apparatus of a User Equipment (UE) operable to communicate with a base station on a wireless network, comprising: one or more processors to: determine that the UE is in an Inactive Radio Resource Control (RRC) state; process a first transmission received by the UE while the UE is in the Inactive RRC state, the first transmission carrying a set of one or more Access Control (AC) parameters; and regulate the sending of a second transmission, in accordance with the set of one or more AC parameters, while the UE is in the Inactive RRC state, an interface for receiving the first transmission from a receiving circuitry and for sending the second transmission to a transmission circuitry.

In example 2, the apparatus of example 1, wherein the set of one or more AC parameters has a hierarchical structure including one or more layers corresponding with one or more of: a common or per Public Land Mobile Network (PLMN) level; a per network slice level; a call type level; a barring type level; or a barring parameter level.

In example 3, the apparatus of any of examples 1 through 2, wherein the set of one or more AC parameters is a first set of one or more AC parameters, and wherein the one or more processors are to: generate a request transmission carrying a request that the base station transmit a second set of one or more AC parameters.

In example 4, the apparatus of any of examples 1 through 3, wherein the set of one or more AC parameters includes, on a barring parameter level, at least one of: a barring factor or a barring time.

In example 5, the apparatus of any of examples 1 through 4, wherein the set of one or more AC parameters includes, on a barring parameter level, at least one of: a barring flag, or a barring bitmap.

In example 6, the apparatus of any of examples 1 through 5, wherein the set of one or more AC parameters includes, on a barring type level, at least one of: an Internet Protocol Multimedia Subsystem (IMS) voice call type, an IMS video call type, an IMS signaling type, an emergency call type, a real-time gaming type, a Hypertext Transfer Protocol (HTTP) based streaming type, or a best-effort Transmission Control Protocol (TCP) traffic type.

In example 7, the apparatus of any of examples 1 through 6, wherein the set of one or more AC parameters includes, on a barring type level, a quality of service (QoS) flow marking based on at least one of: a guaranteed bit rate (GBR) flow, or a non-GBR flow.

In example 8, the apparatus of any of examples 1 through 7, wherein the first transmission is a broadcast System Information (SI) transmission.

In example 9, the apparatus of any of examples 1 through 8, wherein the set of one or more AC parameters is a first set of one or more AC parameters, and wherein the one or more processors are to: determine that the UE is in an Idle RRC state; process a third transmission received by the UE while the UE is in the Idle RRC state, the third transmission carrying a third set of one or more AC parameters; and regulate the generation of a fourth transmission, in accordance with the third set of one or more AC parameters, while the UE is in the Idle RRC state.

In example 10, the apparatus of any of examples 1 through 9, wherein the base station is a fifth generation (5G) wireless cellular communication system capable Evolved Node-B (eNB).

Example 11 provides a User Equipment (UE) device comprising an application processor, a memory, one or more antennas, a wireless interface for allowing the application processor to communicate with another device, and a touchscreen display, the UE device including the apparatus of any of examples 1 through 10.

Example 12 provides a method comprising: determining, for a User Equipment (UE) operable to communicate with a base station on a wireless network, that the UE is in an Inactive Radio Resource Control (RRC) state; processing a first transmission received by the UE while the UE is in the Inactive RRC state, the first transmission carrying a set of one or more Access Control (AC) parameters; and regulating the sending of a second transmission, in accordance with the set of one or more AC parameters, while the UE is in the Inactive RRC state.

In example 13, the method of example 12, wherein the set of one or more AC parameters has a hierarchical structure including one or more layers corresponding with one or more of: a common or per Public Land Mobile Network (PLMN) level; a per network slice level; a call type level; a barring type level; or a barring parameter level.

In example 14, the method of example 12, comprising: generating a request transmission carrying a request that the base station transmit a second set of one or more AC parameters.

In example 15, the method of any of examples 12 through 14, wherein the set of one or more AC parameters includes, on a barring parameter level, at least one of: a barring factor or a barring time.

In example 16, the method of any of examples 12 through 15, wherein the set of one or more AC parameters includes, on a barring parameter level, at least one of: a barring flag, or a barring bitmap.

In example 17, the method of any of examples 12 through 16, wherein the set of one or more AC parameters includes, on a barring type level, at least one of: an Internet Protocol Multimedia Subsystem (IMS) voice call type, an IMS video call type, an IMS signaling type, an emergency call type, a real-time gaming type, a Hypertext Transfer Protocol (HTTP) based streaming type, or a best-effort Transmission Control Protocol (TCP) traffic type.

In example 18, the method of any of examples 12 through 17, wherein the set of one or more AC parameters includes, on a barring type level, a quality of service (QoS) flow marking based on at least one of: a guaranteed bit rate (GBR) flow, or a non-GBR flow.

In example 19, the method of any of examples 12 through 18, wherein the first transmission is a broadcast System Information (SI) transmission.

In example 20, the method of any of examples 12 through 19, wherein the set of one or more AC parameters is a first set of one or more AC parameters, comprising: determining that the UE is in an Idle RRC state; processing a third transmission received by the UE while the UE is in the Idle RRC state, the third transmission carrying a third set of one or more AC parameters; and regulating the generation of a fourth transmission, in accordance with the third set of one or more AC parameters, while the UE is in the Idle RRC state.

In example 21, the method of any of examples 12 through 20, wherein the base station is a fifth generation (5G) wireless cellular communication system capable Evolved Node-B (eNB).

Example 22 provides machine readable storage media having machine executable instructions stored thereon that, when executed, cause one or more processors to perform a method according to any of examples 12 through 21.

Example 23 provides an apparatus of a User Equipment (UE) operable to communicate with a base station on a wireless network, comprising: means for determining that the UE is in an Inactive Radio Resource Control (RRC) state; means for processing a first transmission received by the UE while the UE is in the Inactive RRC state, the first transmission carrying a set of one or more Access Control (AC) parameters; and means for regulating the sending of a second transmission, in accordance with the set of one or more AC parameters, while the UE is in the Inactive RRC state.

In example 24, the apparatus of example 23, wherein the set of one or more AC parameters has a hierarchical structure including one or more layers corresponding with one or more of: a common or per Public Land Mobile Network (PLMN) level; a per network slice level; a call type level; a barring type level; or a barring parameter level.

In example 25, the apparatus of example 23, comprising: means for generating a request transmission carrying a request that the base station transmit a second set of one or more AC parameters.

In example 26, the apparatus of any of examples 23 through 25, wherein the set of one or more AC parameters includes, on a barring parameter level, at least one of: a barring factor or a barring time.

In example 27, the apparatus of any of examples 23 through 26, wherein the set of one or more AC parameters includes, on a barring parameter level, at least one of: a barring flag, or a barring bitmap.

In example 28, the apparatus of any of examples 23 through 27, wherein the set of one or more AC parameters includes, on a barring type level, at least one of: an Internet Protocol Multimedia Subsystem (IMS) voice call type, an IMS video call type, an IMS signaling type, an emergency call type, a real-time gaming type, a Hypertext Transfer Protocol (HTTP) based streaming type, or a best-effort Transmission Control Protocol (TCP) traffic type.

In example 29, the apparatus of any of examples 23 through 28, wherein the set of one or more AC parameters includes, on a barring type level, a quality of service (QoS) flow marking based on at least one of: a guaranteed bit rate (GBR) flow, or a non-GBR flow.

In example 30, the apparatus of any of examples 23 through 29, wherein the first transmission is a broadcast System Information (SI) transmission.

In example 31, the apparatus of any of examples 23 through 30, wherein the set of one or more AC parameters is a first set of one or more AC parameters, comprising: means for determining that the UE is in an Idle RRC state; means for processing a third transmission received by the UE while the UE is in the Idle RRC state, the third transmission carrying a third set of one or more AC parameters; and means for regulating the generation of a fourth transmission, in accordance with the third set of one or more AC parameters, while the UE is in the Idle RRC state.

In example 32, the apparatus of any of examples 23 through 31, wherein the base station is a fifth generation (5G) wireless cellular communication system capable Evolved Node-B (eNB).

Example 33 provides machine readable storage media having machine executable instructions that, when executed, cause one or more processors of a User Equipment (UE) operable to communicate with a base station on a wireless network to perform an operation comprising: determine that the UE is in an Inactive Radio Resource Control (RRC) state; process a first transmission received by the UE while the UE is in the Inactive RRC state, the first transmission carrying a set of one or more Access Control (AC) parameters; and regulate the sending of a second transmission, in accordance with the set of one or more AC parameters, while the UE is in the Inactive RRC state.

In example 34, the machine readable storage media of example 33, wherein the set of one or more AC parameters has a hierarchical structure including one or more layers corresponding with one or more of: a common or per Public Land Mobile Network (PLMN) level; a per network slice level; a call type level; a barring type level; or a barring parameter level.

In example 35, the machine readable storage media of example 33, the operation comprising: generate a request transmission carrying a request that the base station transmit a second set of one or more AC parameters.

In example 36, the machine readable storage media of any of examples 33 through 35, wherein the set of one or more AC parameters includes, on a barring parameter level, at least one of: a barring factor or a barring time.

In example 37, the machine readable storage media of any of examples 33 through 36, wherein the set of one or more AC parameters includes, on a barring parameter level, at least one of: a barring flag, or a barring bitmap.

In example 38, the machine readable storage media of any of examples 33 through 37, wherein the set of one or more AC parameters includes, on a barring type level, at least one of: an Internet Protocol Multimedia Subsystem (IMS) voice call type, an IMS video call type, an IMS signaling type, an emergency call type, a real-time gaming type, a Hypertext Transfer Protocol (HTTP) based streaming type, or a best-effort Transmission Control Protocol (TCP) traffic type.

In example 39, the machine readable storage media of any of examples 33 through 38, wherein the set of one or more AC parameters includes, on a barring type level, a quality of service (QoS) flow marking based on at least one of: a guaranteed bit rate (GBR) flow, or a non-GBR flow.

In example 40, the machine readable storage media of any of examples 33 through 39, wherein the first transmission is a broadcast System Information (SI) transmission.

In example 41, the machine readable storage media of any of examples 33 through 40, wherein the set of one or more AC parameters is a first set of one or more AC parameters, the operation comprising: determine that the UE is in an Idle RRC state; process a third transmission received by the UE while the UE is in the Idle RRC state, the third transmission carrying a third set of one or more AC parameters; and regulate the generation of a fourth transmission, in accordance with the third set of one or more AC parameters, while the UE is in the Idle RRC state.

In example 42, the machine readable storage media of any of examples 33 through 41, wherein the base station is a fifth generation (5G) wireless cellular communication system capable Evolved Node-B (eNB).

Example 43 provides an apparatus of a User Equipment (UE) operable to communicate with a base station on a wireless network, comprising: one or more processors to: determine that the UE is in an Inactive Radio Resource Control (RRC) state or Connected RRC state; process a first transmission received by the UE, the first transmission carrying a set of one or more Access Control (AC) parameters; and regulate the sending of a second transmission, in accordance with the set of one or more AC parameters, while the UE is in the Inactive RRC state or the Connected RRC state, and wherein the set of one or more AC parameters has a hierarchical structure including one or more layers corresponding with one or more of: a common or per Public Land Mobile Network (PLMN) level; a per network slice level; a call type level; a barring type level; or a barring parameter level, and an interface for receiving the first transmission from a receiving circuitry and for sending the second transmission to a transmission circuitry.

In example 44, the apparatus of example 43, wherein the one or more processors are to: generate a request transmission carrying a request that the base station transmit a second set of one or more AC parameters.

In example 45, the apparatus of any of examples 43 through 44, wherein the set of one or more AC parameters includes, on a barring parameter level, at least one of: a barring factor or a barring time.

In example 46, the apparatus of any of examples 43 through 45, wherein the set of one or more AC parameters includes, on a barring parameter level, at least one of: a barring flag, or a barring bitmap.

In example 47, the apparatus of any of examples 43 through 46, wherein the set of one or more AC parameters includes, on a barring type level, at least one of: an Internet Protocol Multimedia Subsystem (IMS) voice call type, an IMS video call type, an IMS signaling type, an emergency call type, a real-time gaming type, a Hypertext Transfer Protocol (HTTP) based streaming type, or a best-effort Transmission Control Protocol (TCP) traffic type.

In example 48, the apparatus of any of examples 43 through 47, wherein the set of one or more AC parameters includes, on a barring type level, a quality of service (QoS) flow marking based on at least one of: a guaranteed bit rate (GBR) flow, or a non-GBR flow.

In example 49, the apparatus of any of examples 43 through 48, wherein the first transmission is a broadcast System Information (SI) transmission.

In example 50, the apparatus of any of examples 43 through 49, wherein the first transmission is a dedicated-signaling transmission.

In example 51, the apparatus of any of examples 43 through 50, wherein the set of one or more AC parameters is a first set of one or more AC parameters, and wherein the one or more processors are to: determine that the UE is in an Idle RRC state; process a third transmission received by the UE while the UE is in the Idle RRC state, the third transmission carrying a third set of one or more AC parameters; and regulate the generation of a fourth transmission, in accordance with the third set of one or more AC parameters, while the UE is in the Idle RRC state.

In example 52, the apparatus of any of examples 43 through 51, wherein the set of one or more AC parameters is a first set of one or more AC parameters, and wherein the one or more processors are to: determine that the UE is in a Connected RRC state; process a fifth transmission received by the UE while the UE is in the Idle RRC state or Connected RRC state, the fifth transmission carrying a fifth set of one or more AC parameters; and regulate the generation of a sixth transmission, in accordance with the fifth set of one or more AC parameters, while the UE is in the Idle RRC state.

In example 53, the apparatus of any of examples 43 through 52, wherein the base station is a fifth generation (5G) wireless cellular communication system capable Evolved Node-B (eNB).

Example 54 provides a User Equipment (UE) device comprising an application processor, a memory, one or more antennas, a wireless interface for allowing the application processor to communicate with another device, and a touch-screen display, the UE device including the apparatus of any of examples 43 through 53.

Example 55 provides a method comprising: determining, for an apparatus of a User Equipment (UE) operable to communicate with a base station on a wireless network, that the UE is in an Inactive Radio Resource Control (RRC) state or Connected RRC state; processing a first transmission received by the UE, the first transmission carrying a set of one or more Access Control (AC) parameters; and regulating the sending of a second transmission, in accordance with the set of one or more AC parameters, while the UE is in the Inactive RRC state or the Connected RRC state, and wherein the set of one or more AC parameters has a hierarchical structure including one or more layers corresponding with one or more of: a common or per Public Land Mobile Network (PLMN) level; a per network slice level; a call type level; a barring type level; or a barring parameter level.

In example 56, the method of example 55, comprising: generating a request transmission carrying a request that the base station transmit a second set of one or more AC parameters.

In example 57, the method of any of examples 55 through 56, wherein the set of one or more AC parameters includes, on a barring parameter level, at least one of: a barring factor or a barring time.

In example 58, the method of any of examples 55 through 57, wherein the set of one or more AC parameters includes, on a barring parameter level, at least one of: a barring flag, or a barring bitmap.

In example 59, the method of any of examples 55 through 58, wherein the set of one or more AC parameters includes, on a barring type level, at least one of: an Internet Protocol Multimedia Subsystem (IMS) voice call type, an IMS video call type, an IMS signaling type, an emergency call type, a real-time gaming type, a Hypertext Transfer Protocol (HTTP) based streaming type, or a best-effort Transmission Control Protocol (TCP) traffic type.

In example 60, the method of any of examples 55 through 59, wherein the set of one or more AC parameters includes, on a barring type level, a quality of service (QoS) flow marking based on at least one of: a guaranteed bit rate (GBR) flow, or a non-GBR flow.

In example 61, the method of any of examples 55 through 60, wherein the first transmission is a broadcast System Information (SI) transmission.

In example 62, the method of any of examples 55 through 61, wherein the first transmission is a dedicated-signaling transmission.

In example 63, the method of any of examples 55 through 62, wherein the set of one or more AC parameters is a first set of one or more AC parameters, comprising: determining that the UE is in an Idle RRC state; processing a third transmission received by the UE while the UE is in the Idle RRC state, the third transmission carrying a third set of one or more AC parameters; and regulating the generation of a fourth transmission, in accordance with the third set of one or more AC parameters, while the UE is in the Idle RRC state.

In example 64, the method of any of examples 55 through 63, wherein the set of one or more AC parameters is a first set of one or more AC parameters, comprising: determining that the UE is in a Connected RRC state; processing a fifth transmission received by the UE while the UE is in the Idle RRC state or Connected RRC state, the fifth transmission carrying a fifth set of one or more AC parameters; and regulating the generation of a sixth transmission, in accordance with the fifth set of one or more AC parameters, while the UE is in the Idle RRC state.

In example 65, the method of any of examples 55 through 64, wherein the base station is a fifth generation (5G) wireless cellular communication system capable Evolved Node-B (eNB).

Example 66 provides machine readable storage media having machine executable instructions stored thereon that, when executed, cause one or more processors to perform a method according to any of examples 55 through 65.

Example 67 provides an apparatus of a User Equipment (UE) operable to communicate with a base station on a wireless network, comprising: means for determining that the UE is in an Inactive Radio Resource Control (RRC) state or Connected RRC state; means for processing a first transmission received by the UE, the first transmission carrying a set of one or more Access Control (AC) parameters; and means for regulating the sending of a second transmission, in accordance with the set of one or more AC parameters, while the UE is in the Inactive RRC state or the Connected RRC state, and wherein the set of one or more AC parameters has a hierarchical structure including one or more layers corresponding with one or more of: a common or per Public Land Mobile Network (PLMN) level; a per network slice level; a call type level; a barring type level; or a barring parameter level.

In example 68, the apparatus of example 67, comprising: means for generating a request transmission carrying a request that the base station transmit a second set of one or more AC parameters.

In example 69, the apparatus of any of examples 67 through 68, wherein the set of one or more AC parameters includes, on a barring parameter level, at least one of: a barring factor or a barring time.

In example 70, the apparatus of any of examples 67 through 69, wherein the set of one or more AC parameters includes, on a barring parameter level, at least one of: a barring flag, or a barring bitmap.

In example 71, the apparatus of any of examples 67 through 70, wherein the set of one or more AC parameters includes, on a barring type level, at least one of: an Internet Protocol Multimedia Subsystem (IMS) voice call type, an IMS video call type, an IMS signaling type, an emergency call type, a real-time gaming type, a Hypertext Transfer Protocol (HTTP) based streaming type, or a best-effort Transmission Control Protocol (TCP) traffic type.

In example 72, the apparatus of any of examples 67 through 71, wherein the set of one or more AC parameters includes, on a barring type level, a quality of service (QoS) flow marking based on at least one of: a guaranteed bit rate (GBR) flow, or a non-GBR flow.

In example 73, the apparatus of any of examples 67 through 72, wherein the first transmission is a broadcast System Information (SI) transmission.

In example 74, the apparatus of any of examples 67 through 73, wherein the first transmission is a dedicated-signaling transmission.

In example 75, the apparatus of any of examples 67 through 74, wherein the set of one or more AC parameters is a first set of one or more AC parameters, comprising: means for determining that the UE is in an Idle RRC state; means for processing a third transmission received by the UE while the UE is in the Idle RRC state, the third transmission carrying a third set of one or more AC parameters; and means for regulating the generation of a fourth transmission, in accordance with the third set of one or more AC parameters, while the UE is in the Idle RRC state.

In example 76, the apparatus of any of examples 67 through 75, wherein the set of one or more AC parameters is a first set of one or more AC parameters, comprising: means for determining that the UE is in a Connected RRC state; means for processing a fifth transmission received by the UE while the UE is in the Idle RRC state or Connected RRC state, the fifth transmission carrying a fifth set of one or more AC parameters; and means for regulating the generation of a sixth transmission, in accordance with the fifth set of one or more AC parameters, while the UE is in the Idle RRC state.

In example 77, the apparatus of any of examples 67 through 76, wherein the base station is a fifth generation (5G) wireless cellular communication system capable Evolved Node-B (eNB).

Example 78 provides machine readable storage media having machine executable instructions that, when executed, cause one or more processors of a User Equipment (UE) operable to communicate with a base station on a wireless network to perform an operation comprising: determine that the UE is in an Inactive Radio Resource Control (RRC) state or Connected RRC state; process a first transmission received by the UE, the first transmission carrying a set of one or more Access Control (AC) parameters; and regulate the sending of a second transmission, in accordance with the set of one or more AC parameters, while the UE is in the Inactive RRC state or the Connected RRC state, and wherein the set of one or more AC parameters has a hierarchical structure including one or more layers corresponding with one or more of: a common or per Public Land Mobile Network (PLMN) level; a per network slice level; a call type level; a barring type level; or a barring parameter level.

In example 79, the machine readable storage media of example 78, the operation comprising: generate a request transmission carrying a request that the base station transmit a second set of one or more AC parameters.

In example 80, the machine readable storage media of any of examples 78 through 79, wherein the set of one or more AC parameters includes, on a barring parameter level, at least one of: a barring factor or a barring time.

In example 81, the machine readable storage media of any of examples 78 through 80, wherein the set of one or more AC parameters includes, on a barring parameter level, at least one of: a barring flag, or a barring bitmap.

In example 82, the machine readable storage media of any of examples 78 through 81, wherein the set of one or more AC parameters includes, on a barring type level, at least one of: an Internet Protocol Multimedia Subsystem (IMS) voice call type, an IMS video call type, an IMS signaling type, an emergency call type, a real-time gaming type, a Hypertext Transfer Protocol (HTTP) based streaming type, or a best-effort Transmission Control Protocol (TCP) traffic type.

In example 83, the machine readable storage media of any of examples 78 through 82, wherein the set of one or more AC parameters includes, on a barring type level, a quality of service (QoS) flow marking based on at least one of: a guaranteed bit rate (GBR) flow, or a non-GBR flow.

In example 84, the machine readable storage media of any of examples 78 through 83, wherein the first transmission is a broadcast System Information (SI) transmission.

In example 85, the machine readable storage media of any of examples 78 through 84, wherein the first transmission is a dedicated-signaling transmission.

In example 86, the machine readable storage media of any of examples 78 through 85, wherein the set of one or more AC parameters is a first set of one or more AC parameters, the operation comprising: determine that the UE is in an Idle RRC state; process a third transmission received by the UE while the UE is in the Idle RRC state, the third transmission carrying a third set of one or more AC parameters; and regulate the generation of a fourth transmission, in accordance with the third set of one or more AC parameters, while the UE is in the Idle RRC state.

In example 87, the machine readable storage media of any of examples 78 through 86, wherein the set of one or more AC parameters is a first set of one or more AC parameters, the operation comprising: determine that the UE is in a Connected RRC state; process a fifth transmission received by the UE while the UE is in the Idle RRC state or Connected RRC state, the fifth transmission carrying a fifth set of one or more AC parameters; and regulate the generation of a sixth transmission, in accordance with the fifth set of one or more AC parameters, while the UE is in the Idle RRC state.

In example 88, the machine readable storage media of any of examples 78 through 87, wherein the base station is a fifth generation (5G) wireless cellular communication system capable Evolved Node-B (eNB).

Example 89 provides an apparatus of a base station operable to communicate with a User Equipment (UE) on a wireless network, comprising: one or more processors to: associate a cell served by the base station with at least a first set of use cases and a second set of use cases; establish a first set of one or more Access Control (AC) parameters corresponding with the first set of use cases; establish a second set of one or more AC parameters corresponding with the second set of use cases; and generate a transmission carrying at least one of the first set of one or more AC parameters or the second set of one or more AC parameters, an interface for sending the transmission to a transmission circuitry.

In example 90, the apparatus of example 89, wherein the transmission is a first transmission, and wherein the one or more processors are to: generate a second transmission carrying the second set of one or more AC parameters.

In example 91, the apparatus of example 89, wherein at least one of the first set of use cases or the second set of use cases includes one or more of: an Enhanced Mobile Broadband (eMBB) use case, a Massive Machine-Type Communication (mMTC) use case, or a Ultra-Reliable and Low Latency Communications (URLLC) use case.

In example 92, the apparatus of any of examples 89 through 90, wherein at least one of the first set of one or more AC parameters or the second set of one or more AC parameters has a hierarchical structure including one or more layers corresponding with one or more of: a common or per Public Land Mobile Network (PLMN) level; a per network slice level; a call type level; a barring type level; or a barring parameter level.

In example 93, the apparatus of any of examples 89 through 92, wherein at least one of the first set of one or more AC parameters or the second set of one or more AC parameters includes at least one of: a barring factor or a barring time.

In example 94, the apparatus of any of examples 89 through 93, wherein the first set of one or more AC parameters has a hierarchical structure including at least a first per network slice level, and a first barring parameter level including a first barring factor; and wherein the second set of one or more AC parameters has a hierarchical structure including at least a second per network slice level, and a second barring parameter level including a second barring factor; and wherein the first barring factor is greater than the second barring factor.

In example 95, the apparatus of any of examples 89 through 94, wherein the first set of one or more AC parameters has a hierarchical structure including at least a first barring type level corresponding with a first service, and a first barring parameter level including a first barring factor; and wherein the second set of one or more AC parameters has a hierarchical structure including at least a second barring type level corresponding with a second service, and a second barring parameter level including a second barring factor; and wherein the first barring factor is greater than the second barring factor.

In example 96, the apparatus of any of examples 89 through 95, wherein the first set of one or more AC parameters includes at least a first service identity index and a first barring factor; wherein the second set of one or more AC parameters includes at least a second service identity index and a second barring factor; and wherein the first barring factor is greater than the second barring factor.

In example 97, the apparatus of any of examples 89 through 96, wherein the base station is a fifth generation (5G) wireless cellular communication system capable Evolved Node-B (eNB).

Example 98 provides an Evolved Node B (eNB) device comprising an application processor, a memory, one or more antenna ports, and an interface for allowing the application processor to communicate with another device, the eNB device including the apparatus of any of examples 89 through 97.

Example 99 provides a method comprising: associating, for a base station operable to communicate with a User Equipment (UE) on a wireless network, a cell served by the base station with at least a first set of use cases and a second set of use cases; establishing a first set of one or more Access Control (AC) parameters corresponding with the first set of use cases; establishing a second set of one or more AC parameters corresponding with the second set of use cases; and generating a transmission carrying at least one of the first set of one or more AC parameters or the second set of one or more AC parameters.

In example 100, the method of example 99, wherein the transmission is a first transmission, comprising: generating a second transmission carrying the second set of one or more AC parameters.

In example 101, the method of example 99, wherein at least one of the first set of use cases or the second set of use cases includes one or more of: an Enhanced Mobile Broadband (eMBB) use case, a Massive Machine-Type Communication (mMTC) use case, or a Ultra-Reliable and Low Latency Communications (URLLC) use case.

In example 102, the method of any of examples 99 through 100, wherein at least one of the first set of one or more AC parameters or the second set of one or more AC parameters has a hierarchical structure including one or more layers corresponding with one or more of: a common or per Public Land Mobile Network (PLMN) level; a per network slice level; a call type level; a barring type level; or a barring parameter level.

In example 103, the method of any of examples 99 through 102, wherein at least one of the first set of one or more AC parameters or the second set of one or more AC parameters includes at least one of: a barring factor or a barring time.

In example 104, the method of any of examples 99 through 103, wherein the first set of one or more AC parameters has a hierarchical structure including at least a first per network slice level, and a first barring parameter level including a first barring factor; and wherein the second set of one or more AC parameters has a hierarchical structure including at least a second per network slice level, and a second barring parameter level including a second barring factor; and wherein the first barring factor is greater than the second barring factor.

In example 105, the method of any of examples 99 through 104, wherein the first set of one or more AC parameters has a hierarchical structure including at least a first barring type level corresponding with a first service, and a first barring parameter level including a first barring factor; and wherein the second set of one or more AC parameters has a hierarchical structure including at least a second barring type level corresponding with a second service, and a second barring parameter level including a second barring factor; and wherein the first barring factor is greater than the second barring factor.

In example 106, the method of any of examples 99 through 105, wherein the first set of one or more AC parameters includes at least a first service identity index and a first barring factor; wherein the second set of one or more AC parameters includes at least a second service identity index and a second barring factor; and wherein the first barring factor is greater than the second barring factor.

In example 107, the method of any of examples 99 through 106, wherein the base station is a fifth generation (5G) wireless cellular communication system capable Evolved Node-B (eNB).

Example 108 provides machine readable storage media having machine executable instructions stored thereon that, when executed, cause one or more processors to perform a method according to any of examples 99 through 107.

Example 109 provides an apparatus of a base station operable to communicate with a User Equipment (UE) on a wireless network, comprising: means for associating a cell served by the base station with at least a first set of use cases and a second set of use cases; means for establishing a first set of one or more Access Control (AC) parameters corresponding with the first set of use cases; means for establishing a second set of one or more AC parameters corresponding with the second set of use cases; and means for generating a transmission carrying at least one of the first set of one or more AC parameters or the second set of one or more AC parameters.

In example 110, the apparatus of example 109, wherein the transmission is a first transmission, comprising: means for generating a second transmission carrying the second set of one or more AC parameters.

In example 111, the apparatus of example 109, wherein at least one of the first set of use cases or the second set of use cases includes one or more of: an Enhanced Mobile Broadband (eMBB) use case, a Massive Machine-Type Communication (mMTC) use case, or a Ultra-Reliable and Low Latency Communications (URLLC) use case.

In example 112, the apparatus of any of examples 109 through 110, wherein at least one of the first set of one or more AC parameters or the second set of one or more AC parameters has a hierarchical structure including one or more layers corresponding with one or more of: a common or per Public Land Mobile Network (PLMN) level; a per network slice level; a call type level; a barring type level; or a barring parameter level.

In example 113, the apparatus of any of examples 109 through 112, wherein at least one of the first set of one or more AC parameters or the second set of one or more AC parameters includes at least one of: a barring factor or a barring time.

In example 114, the apparatus of any of examples 109 through 113, wherein the first set of one or more AC parameters has a hierarchical structure including at least a first per network slice level, and a first barring parameter level including a first barring factor; and wherein the second set of one or more AC parameters has a hierarchical structure including at least a second per network slice level, and a second barring parameter level including a second barring factor; and wherein the first barring factor is greater than the second barring factor.

In example 115, the apparatus of any of examples 109 through 114, wherein the first set of one or more AC parameters has a hierarchical structure including at least a first barring type level corresponding with a first service, and a first barring parameter level including a first barring factor; and wherein the second set of one or more AC parameters has a hierarchical structure including at least a second barring type level corresponding with a second service, and a second barring parameter level including a second barring factor; and wherein the first barring factor is greater than the second barring factor.

In example 116, the apparatus of any of examples 109 through 115, wherein the first set of one or more AC parameters includes at least a first service identity index and a first barring factor; wherein the second set of one or more AC parameters includes at least a second service identity index and a second barring factor; and wherein the first barring factor is greater than the second barring factor.

In example 117, the apparatus of any of examples 109 through 116, wherein the base station is a fifth generation (5G) wireless cellular communication system capable Evolved Node-B (eNB).

Example 118 provides machine readable storage media having machine executable instructions that, when executed, cause one or more processors of a base station operable to communicate with a User Equipment (UE) on a wireless network to perform an operation comprising: associate a cell served by the base station with at least a first set of use cases and a second set of use cases; establish a first set of one or more Access Control (AC) parameters corresponding with the first set of use cases; establish a second set of one or more AC parameters corresponding with the second set of use cases; and generate a transmission carrying at least one of the first set of one or more AC parameters or the second set of one or more AC parameters.

In example 119, the machine readable storage media of example 118, wherein the transmission is a first transmission, the operation comprising: generate a second transmission carrying the second set of one or more AC parameters.

In example 120, the machine readable storage media of example 118, wherein at least one of the first set of use cases or the second set of use cases includes one or more of: an Enhanced Mobile Broadband (eMBB) use case, a Massive Machine-Type Communication (mMTC) use case, or a Ultra-Reliable and Low Latency Communications (URLLC) use case.

In example 121, the machine readable storage media of any of examples 118 through 119, wherein at least one of the first set of one or more AC parameters or the second set of one or more AC parameters has a hierarchical structure including one or more layers corresponding with one or more of: a common or per Public Land Mobile Network (PLMN) level; a per network slice level; a call type level; a barring type level; or a barring parameter level.

In example 122, the machine readable storage media of any of examples 118 through 121, wherein at least one of the first set of one or more AC parameters or the second set of one or more AC parameters includes at least one of: a barring factor or a barring time.

In example 123, the machine readable storage media of any of examples 118 through 122, wherein the first set of one or more AC parameters has a hierarchical structure including at least a first per network slice level, and a first barring parameter level including a first barring factor; and wherein the second set of one or more AC parameters has a hierarchical structure including at least a second per network slice level, and a second barring parameter level including a second barring factor; and wherein the first barring factor is greater than the second barring factor.

In example 124, the machine readable storage media of any of examples 118 through 123, wherein the first set of one or more AC parameters has a hierarchical structure including at least a first barring type level corresponding with a first service, and a first barring parameter level including a first barring factor; and wherein the second set of one or more AC parameters has a hierarchical structure including at least a second barring type level corresponding with a second service, and a second barring parameter level including a second barring factor; and wherein the first barring factor is greater than the second barring factor.

In example 125, the machine readable storage media of any of examples 118 through 124, wherein the first set of one or more AC parameters includes at least a first service identity index and a first barring factor; wherein the second set of one or more AC parameters includes at least a second service identity index and a second barring factor; and wherein the first barring factor is greater than the second barring factor.

In example 126, the machine readable storage media of any of examples 118 through 125, wherein the base station is a fifth generation (5G) wireless cellular communication system capable Evolved Node-B (eNB).

In example 127, the apparatus of any of examples 43 through 53, and 89 through 97, wherein the one or more processors comprise a baseband processor.

In example 128, the apparatus of any of examples 43 through 53, and 89 through 97, comprising a memory for storing instructions, the memory being coupled to the one or more processors.

In example 129, the apparatus of any of examples 43 through 53, and 89 through 97, comprising a transceiver circuitry for at least one of: generating transmissions, encoding transmissions, processing transmissions, or decoding transmissions.

In example 130, the apparatus of any of examples 43 through 53, and 89 through 97, comprising a transceiver circuitry for generating transmissions and processing transmissions.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:
1. A User Equipment (UE) operable to communicate with a base station on a wireless network, comprising:
   one or more processors configured to:
      determine that the UE is in an Inactive Radio Resource Control (RRC) state;
      process a first transmission received by the UE while the UE is in the Inactive RRC state, the first transmission carrying a set of Access Control (AC) parameters; and
      regulate the sending of a second transmission in accordance with the set of AC parameters while the UE is in the Inactive RRC state, wherein the set of AC parameters has a hierarchical structure including a first level of AC parameters in common for a plurality of Public Land Mobile Networks (PLMNs) or based on each of the PLMNs, and a second level of AC parameters based on a plurality of network slices associated with the plurality of PLMNs; and an interface for receiving the first transmission from a receiving circuitry and for sending the second transmission to a transmission circuitry.

2. The UE of claim 1, wherein the hierarchical structure includes a third level of AC parameters based on a call type, a fourth level of AC parameters based on a barring type and a fifth level of AC parameters based on a barring parameter.

3. The UE of claim 1, wherein the set of AC parameters is a first set of AC parameters, and wherein the one or more processors are further configured to:
generate a request transmission carrying a request that the base station transmit a second set of AC parameters.

4. The UE of claim 1, wherein the set of AC parameters further includes, on a barring parameter level, at least one of: a barring factor or a barring time.

5. The UE of claim 1, wherein the set of AC parameters further includes, on a barring parameter level, at least one of: a barring flag or a barring bitmap.

6. The UE of claim 1, wherein the set of AC parameters includes, on a barring type level, at least one of: an Internet Protocol Multimedia Subsystem (IMS) voice call type, an IMS video call type, an IMS signaling type, an emergency call type, a real-time gaming type, a Hypertext Transfer Protocol (HTTP) based streaming type, or a best-effort Transmission Control Protocol (TCP) traffic type.

7. A non-transitory computer-readable medium storing instructions that, when executed by a processor of a user equipment (UE) operable to communicate with a base station on a wireless network, cause the processor to perform operations, comprising:
determining that the UE is in an Inactive Radio Resource Control (RRC) state;
processing a first transmission received by the UE while the UE is in the Inactive RRC state, the first transmission carrying a set of Access Control (AC) parameters; and
regulating the sending of a second transmission in accordance with the set of AC parameters while the UE is in the Inactive RRC state, wherein the set of AC parameters has a hierarchical structure including a first level of AC parameters in common for a plurality of Public Land Mobile Networks (PLMNs) or based on each of the PLMNs, and a second level of AC parameters based a plurality of network slices associated with the plurality of PLMNs.

8. The non-transitory computer-readable medium of claim 7, wherein the hierarchical structure includes a third level of AC parameters based on a call type, and a fourth level of AC parameters based on a barring type.

9. The non-transitory computer-readable medium of claim 7, the operations further comprising: generating a request transmission carrying a request that the base station transmit a second set of AC parameters.

10. The non-transitory computer-readable medium of claim 7, wherein the set of AC parameters includes, on a barring parameter level, at least one of: a barring factor or a barring time.

11. The non-transitory computer-readable medium of claim 7, wherein the set of AC parameters includes, on a barring parameter level, at least one of: a barring flag or a barring bitmap.

12. The non-transitory computer-readable medium of claim 7, wherein the set of AC parameters includes, on a barring type level, at least one of: an Internet Protocol Multimedia Subsystem (IMS) voice call type, an IMS video call type, an IMS signaling type, an emergency call type, a real-time gaming type, a Hypertext Transfer Protocol (HTTP) based streaming type, or a best-effort Transmission Control Protocol (TCP) traffic type.

13. A User Equipment (UE) operable to communicate with a base station on a wireless network, comprising:
one or more processors configured to:
determine that the UE is in an Inactive Radio Resource Control (RRC) state or Connected RRC state;
process a first transmission received by the UE, the first transmission carrying a set of Access Control (AC) parameters; and
regulate the sending of a second transmission in accordance with the set of AC parameters while the UE is in the Inactive RRC state or the Connected RRC state, wherein the set of AC parameters has a hierarchical structure including a first level of AC parameters in common for a plurality of Public Land Mobile Networks (PLMNs) or based on each of the PLMNs, a second level of AC parameters based on a plurality of network slices associated with the plurality of PLMNs, and a third level of AC parameters based on a call type, and a fourth level of AC parameters based on a barring type; and
an interface for receiving the first transmission from a receiving circuitry and for sending the second transmission to a transmission circuitry.

14. The UE of claim 13, wherein the one or more processors are configured to: generate a request transmission carrying a request that the base station transmit a second set of AC parameters.

15. The UE of claim 13, wherein the set of AC parameters further includes, on a barring parameter level, at least one of: a barring factor or a barring time.

16. The UE of claim 13, wherein the set of AC parameters further includes, on a barring parameter level, at least one of: a barring flag, or a barring bitmap.

17. The UE of claim 13, wherein the set of AC parameters includes, on a barring type level, at least one of: an Internet Protocol Multimedia Subsystem (IMS) voice call type, an IMS video call type, an IMS signaling type, an emergency call type, a real-time gaming type, a Hypertext Transfer Protocol (HTTP) based streaming type, or a best-effort Transmission Control Protocol (TCP) traffic type.

18. The UE of claim 13, wherein the set of AC parameters includes, on a barring type level, a quality of service (QoS) flow marking based on at least one of: a guaranteed bit rate (GBR) flow, or a non-GBR flow.

19. A non-transitory computer-readable medium storing instructions that, when executed by a processor of a user equipment (UE) operable to communicate with a base station on a wireless network, cause the processor to perform operations, comprising:
determining that the UE is in an Inactive Radio Resource Control (RRC) state or a Connected RRC state;
processing a first transmission received by the UE, the first transmission carrying a set of Access Control (AC) parameters; and
regulating the sending of a second transmission, in accordance with the set of AC parameters, while the UE is in the Inactive RRC state or the Connected RRC state, and
wherein the set of AC parameters has a hierarchical structure including a first level of AC parameters in common for a plurality of Public Land Mobile Networks (PLMNs) or based on each of the PLMNs, a second level of AC parameters based on each of a plurality of network slices associated with the plurality of PLMNs, a third level of AC parameters based on a call type, and a fourth level of AC parameters based on a barring type.

20. The non-transitory computer-readable medium of claim 19, the operations further comprising: generating a request transmission carrying a request that the base station transmit a second set of AC parameters.

21. The non-transitory computer-readable medium of claim 19, wherein the set of AC parameters further includes, on a barring parameter level, at least one of: a barring factor or a barring time.

22. The non-transitory computer-readable medium of claim 19, wherein the set of AC parameters further includes, on a barring parameter level, at least one of: a barring flag or a barring bitmap.

23. The non-transitory computer-readable medium of claim 19, wherein the set of AC parameters includes, on a barring type level, at least one of: an Internet Protocol Multimedia Subsystem (IMS) voice call type, an IMS video call type, an IMS signaling type, an emergency call type, a real-time gaming type, a Hypertext Transfer Protocol (HTTP) based streaming type, or a best-effort Transmission Control Protocol (TCP) traffic type.

24. The non-transitory computer-readable medium of claim 19, wherein the set of AC parameters further includes, on a barring type level, a quality of service (QoS) flow marking based on at least one of: a guaranteed bit rate (GBR) flow, or a non-GBR flow.

* * * * *